United States Patent
Antonsson

(10) Patent No.: US 11,804,977 B2
(45) Date of Patent: Oct. 31, 2023

(54) MONITORING CONTROLLER AREA NETWORK (CAN) XL NODES

(71) Applicant: Volvo Car Corporation, Gothenburg (SE)

(72) Inventor: Anders Bertil Antonsson, Västra Frölunda (SE)

(73) Assignee: VOLVO CAR CORPORATION, Gothenburg (SE)

( * ) Notice: Subject to any disclaimer, the term of this patent is extended or adjusted under 35 U.S.C. 154(b) by 0 days.

(21) Appl. No.: 17/324,813

(22) Filed: May 19, 2021

(65) Prior Publication Data

US 2022/0376948 A1    Nov. 24, 2022

(51) Int. Cl.
*H04L 12/40* (2006.01)
*H04L 41/0803* (2022.01)

(52) U.S. Cl.
CPC .......... *H04L 12/40* (2013.01); *H04L 41/0803* (2013.01); *H04L 2012/40215* (2013.01)

(58) Field of Classification Search
CPC ................. H04L 12/40; H04L 41/0803; H04L 2012/40215; H04L 12/40169; H04L 12/40026; H04L 12/40084
See application file for complete search history.

(56) References Cited

U.S. PATENT DOCUMENTS

| | | | |
|---|---|---|---|
| 2014/0156893 A1 | 6/2014 | Monroe et al. | |
| 2020/0382340 A1 | 12/2020 | Muth | |
| 2021/0001788 A1 | 1/2021 | De Haas | |
| 2021/0120017 A1 | 4/2021 | Antonsson | |
| 2021/0224079 A1* | 7/2021 | Muth | H04B 1/38 |
| 2021/0374083 A1* | 12/2021 | de Haas | H04L 12/40 |

FOREIGN PATENT DOCUMENTS

| | | |
|---|---|---|
| DE | 102018221680 A1 | 6/2020 |
| DE | 102019213783 A1 | 3/2021 |
| EP | 3691197 A1 | 1/2019 |
| EP | 3544239 A1 | 9/2019 |
| EP | 3700137 A1 | 8/2020 |

(Continued)

OTHER PUBLICATIONS

CAN in Automation | www.can-cia.org, last accessed on Apr. 7, 2021.

(Continued)

*Primary Examiner* — Nishant Divecha
(74) *Attorney, Agent, or Firm* — Amin, Turocy & Watson, LLP

(57) ABSTRACT

A method can comprise determining, by a device comprising a processor, a transition between an arbitration phase of a Controller Area Network (CAN) XL node of a group of communicatively coupled CAN XL nodes of a CAN bus network and a data phase of the CAN XL node based on a voltage change of a voltage level of the CAN XL node being determined, by device, to satisfy a defined voltage change criterion of defined voltage criteria, wherein the data phase comprises both positive voltages and negative voltages, and in response to determining the transition, routing, by the device, dominant data or logic 0/1 data of the CAN XL nodes to other nodes of the group of CAN XL nodes.

20 Claims, 18 Drawing Sheets

(56) References Cited

FOREIGN PATENT DOCUMENTS

EP          3745656 A2    12/2020
WO       2020120555 A1    6/2020

OTHER PUBLICATIONS

Vector | "CAN—Still Room for Improvement". VO.1, Nov. 7, 2019, 24 pages.
Lennartsson, K. | "CAN XL. The Next Generation of CAN". CAN in space workshop, Gothenburg, Jun. 13, 2019, 17 pages.
Bosch | "CAN XL. Next Step in CAN Evolution". Automotive Electronics, AE/EIY4, May 29, 2020, 13 pages.
CAN Newsletter Online | "Classical CAN, CAN FD, and CAN XL". Dec. 20, 2018, 2 pages.
CAN Newsletter Online | "welcome CAN XL". Jan. 3, 2020, 3 pages.
Kvaser | CAN XL: Bridging the bitrate gap between CAN FD and Ethernet. Feb. 27, 2020, 4 pages.
CAN XL | The physical layer in the CAN XL world. CAN Newsletter Apr. 2020, 6 pages.
Bosch Semiconductors | Automotive IP modules. CAN XL. Next Step in CAN evolution. https://www.bosch-semiconductors.com/ip-modules/in-vehicle-communication-ip/can-ip-modules/can-xl/, last accessed on May 5, 2021.
Bosch | The next Step in CAN Evolution. Current Status of the CAN XL standardization @ CIA. Feb. 2021, 16 pages.
Bosch Semiconductors | CAN XL. Next Step in CAN evolution. https://web.archive.org/web/20200707212027/https://www.bosch-semiconductors.com/news/t-newsdetailpage-4.html, archived page, last accessed on May 7, 2021.
Extended EP Search Report for EP Application No. 22170000.8 dated Sep. 22, 2022.
Chinese Office Action for Chinese Application No. 202210544491.0 dated May 23, 2023.

* cited by examiner

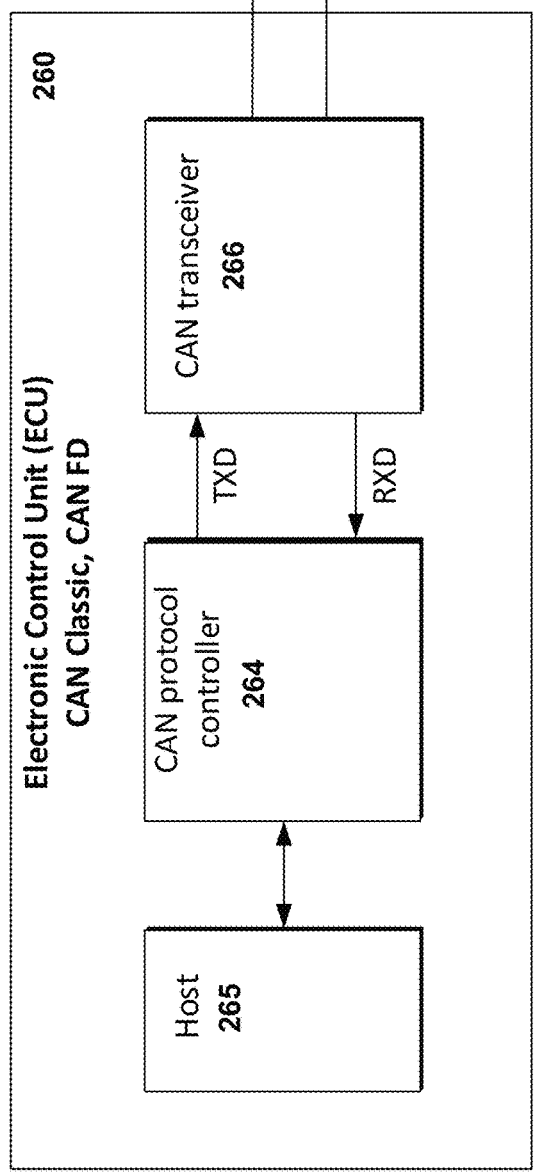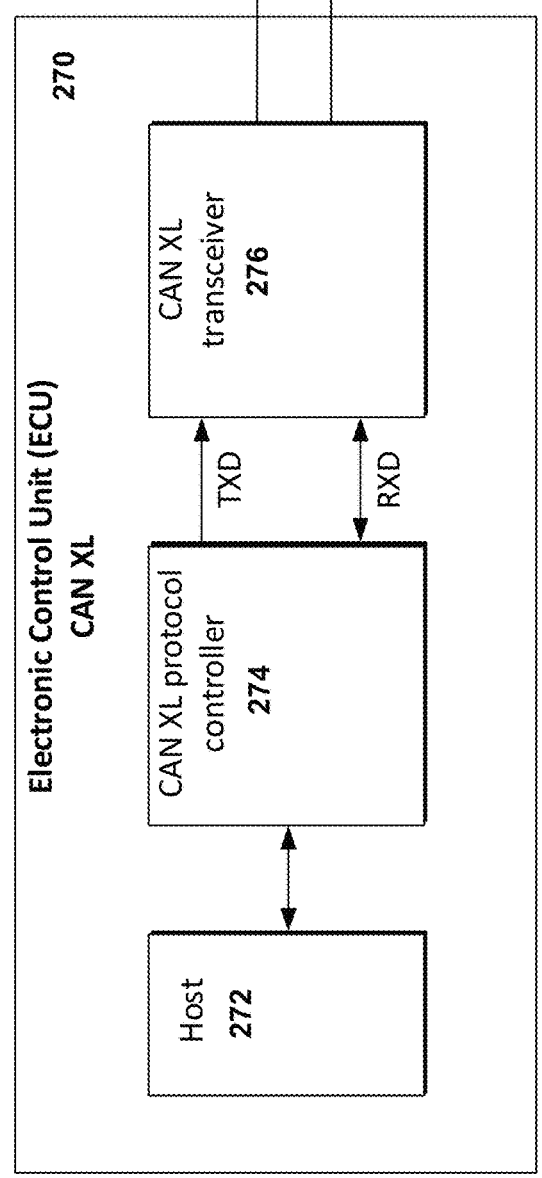
FIG. 2A
FIG. 2B

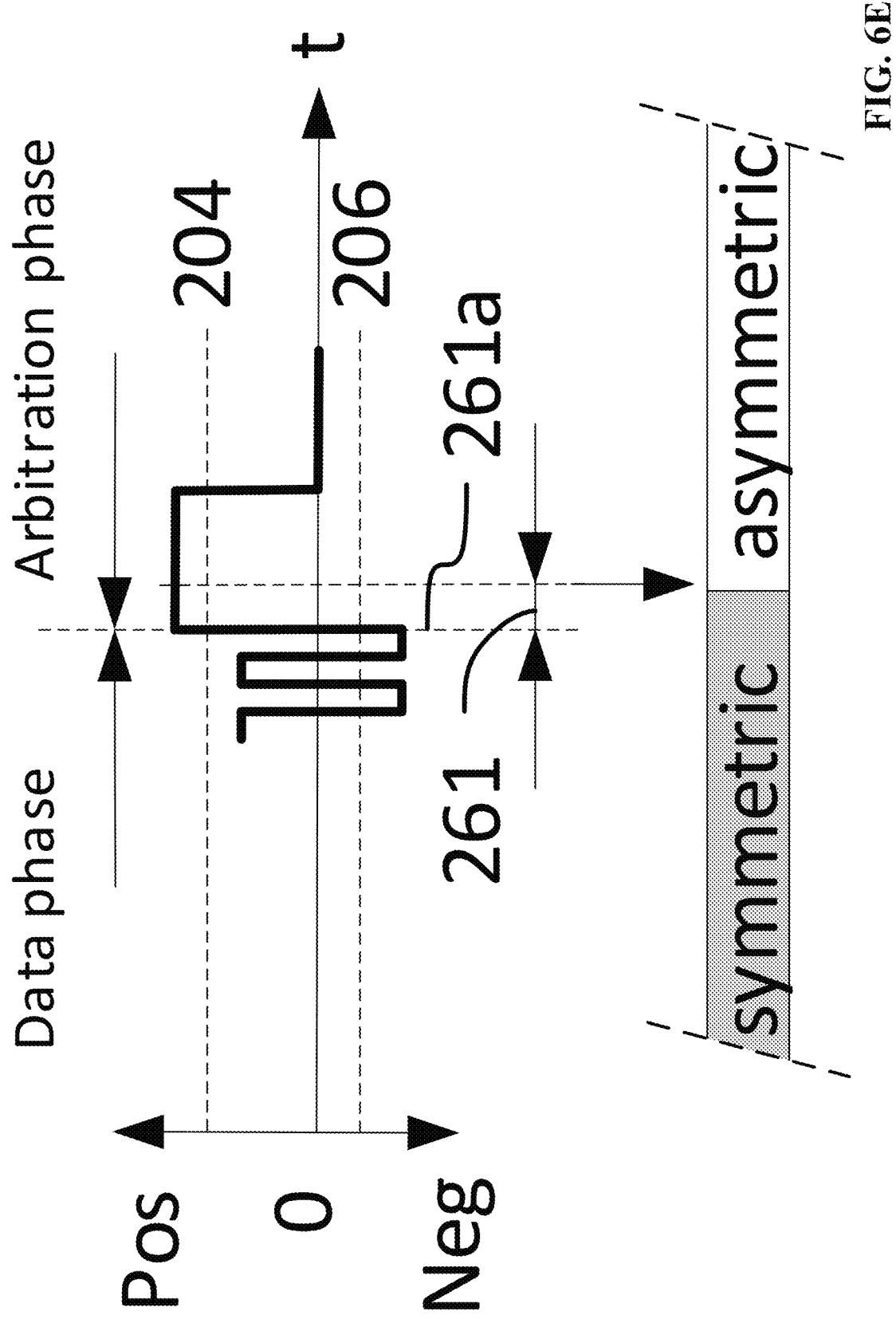

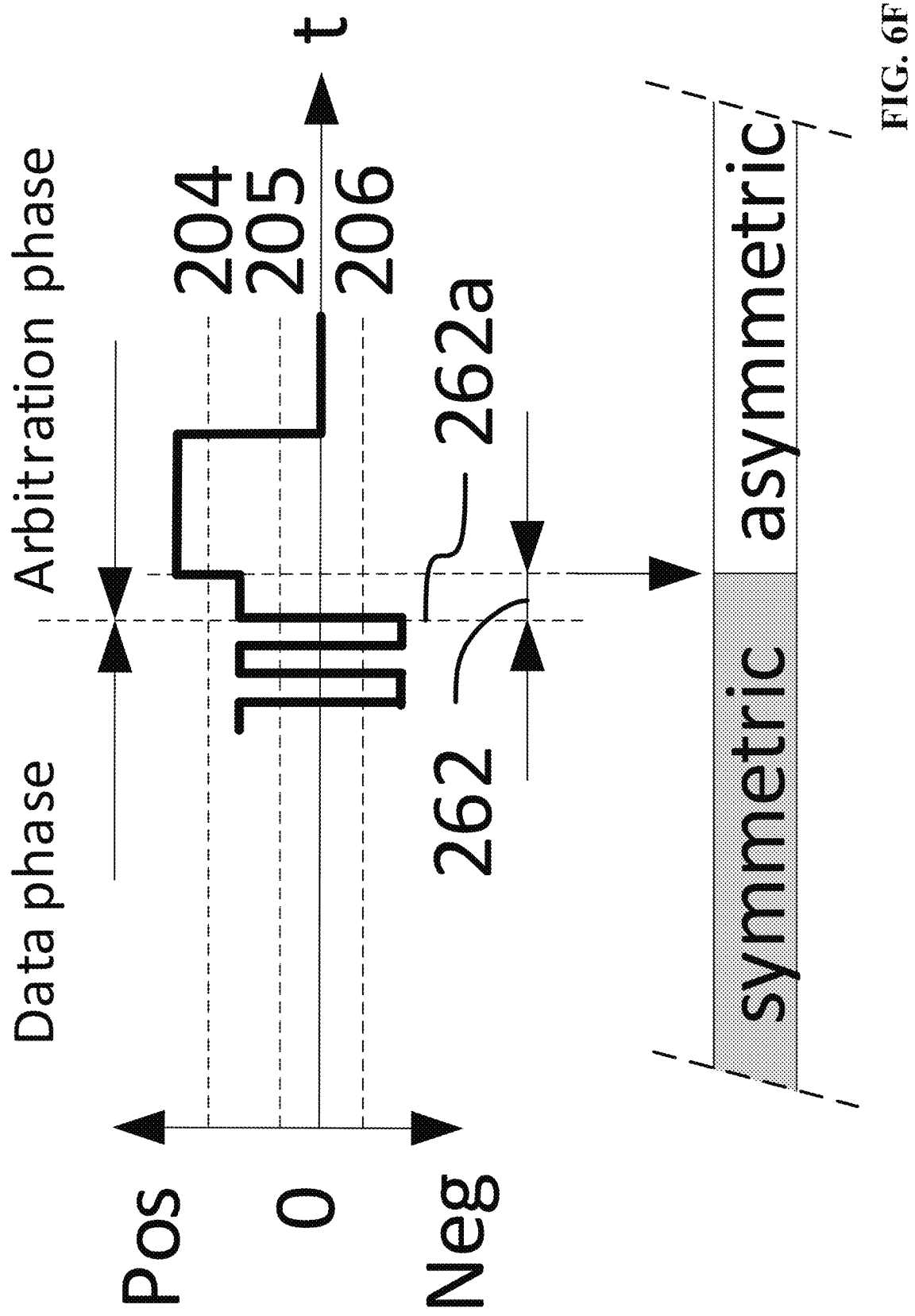

MONITORING CONTROLLER AREA NETWORK (CAN) XL NODES

TECHNICAL FIELD

The disclosed subject matter relates to systems and methods for monitoring of Controller Area Network (CAN) XL nodes.

BACKGROUND

The automotive industry extensively utilizes CAN bus technology. Many other industries utilize CAN as well. To date, two generations of CAN protocols have been primarily implemented in mass-produced vehicles: CAN (now referred to as CAN Classic) and CAN Flexible Data Rate (CAN FD). A third generation, called CAN XL (or CAN EL), is forthcoming and is expected to be included in a future version of the International Standards Organization's (ISO) ISO-11898-1 and/or ISO-11898-2 standard. CAN XL is expected to require a new type of hardware CAN transceiver, which will be switched between two operational modes during communication.

CAN XL transceivers switch between an asymmetric differential mode (in which there are two bus states: dominant/recessive) and a symmetric differential mode (e.g., push/pull or logic 0/1). This is a significant change as compared to CAN Classic and CAN FD transceivers, because CAN Classic and CAN FD transceivers are not switched and always operate in an asymmetric differential mode. Thus, CAN Classic and CAN FD transceivers do not support CAN XL networks with differential symmetric transmission. In this regard, CAN Classic and CAN FD transceivers do not support the push/pull or logic 0/1 mode of CAN XL transceivers.

It is noted that an asymmetric differential mode indicates that a transceiver transmits/receives in a recessive bus state using zero voltage, and in the dominant bus state uses positive differential CAN bus voltages. A symmetric differential mode indicates that a transceiver transmits/receives positive and negative differential CAN bus voltages, but not zero voltage.

In total, a CAN Classic/CAN FD transceiver operates with two differential bus voltages, while a CAN XL transceiver can operate with four differential bus voltages. A CAN Classic/CAN FD transceiver cannot differentiate between positive and negative differential bus voltages representing logic 0/1 bits of a CAN XL data phase when transmitted by a CAN XL transceiver in symmetric differential mode. In this regard, a CAN Classic/CAN FD transceiver will recognize these bits as the same value. Consequently, the CAN Classic/CAN FD transceiver cannot receive the actual data bits contained in a CAN XL data phase.

The mode switching of a CAN XL transceiver can require a CAN XL protocol controller to switch the transceiver. Absent such a CAN XL protocol controller, the CAN XL transceiver cannot determine when/how to switch modes because mode switching logic is not specified for the transceiver. This transceiver mode control is new for CAN XL and is far more complex than the operation of CAN Classic/CAN FD transceivers.

CAN XL communication problems can comprise the following, among others:

(1) At least one CAN XL node is unexpectedly transmitting a CAN frame and the CAN XL node that is transmitting the frame needs to be determined. The CAN frame identifier is not included in a CAN database specification and therefore that database cannot conclude which CAN XL node is unexpectedly transmitting the CAN frame.

(2) At least one CAN XL node is unexpectedly transmitting a CAN frame, and an associated CAN frame identifier is not included in a CAN database specification—it is assigned to another CAN XL node. The CAN XL node that is transmitting the frame needs to be determined.

(3) At least one CAN XL node is unexpectedly causing CAN error flag, which is then correctly echoed by other CAN XL nodes. The error flag is an indication of communication error and causes a failed frame transmission in which the frame does not reach intended CAN XL nodes. The error flag is not included in a CAN database specification, and therefore a CAN database cannot conclude which CAN XL node is responsible. The CAN XL node that is transmitting the error flag needs to be determined.

(4) A CAN XL node is unexpectedly not transmitting frames, however, it may transmit ACK (an acknowledgement bit) as confirmation of other CAN nodes transmitting frames. However, all CAN XL nodes are expected to transmit ACK at the same bit time, and therefore it cannot be determined if a particular CAN XL node is transmitting an ACK. The CAN XL node that is transmitting the ACK needs to be determined.

(5) At least one CAN XL node is attempting to transmit a frame, but there is a fault in the frame transmission and the CAN identifier cannot be identified. The CAN XL node that is transmitting the frame needs to be determined.

(6) At least one CAN XL node is transmitting a frame in a format (e.g., normal frame, extended frame, remote frame, or flexible data frame) that is not the expected frame format. The CAN XL node that is transmitting the frame needs to be determined.

(7) A CAN XL node is disturbing the bus, which causes frame transmission failure. The CAN XL node that is disturbing the bus needs to be determined.

(8) In a system analysis situation, with or without a CAN database specification available, frame transmission information needs to be acquired from a CAN XL system and which CAN identifiers are used needs to be determined with CAN XL nodes for data frame transmission.

Consequently, tapping and/or monitoring of associated RXD signals for further analysis can be beneficial.

By definition, the CAN XL protocol supports the CAN Classic data frame formats Classical Base Frame (CBFF) and Classical Extended Frame Format (CEFF), the CAN FD data frame formats FD Base Frame Format (FBFF) and FD Extended Frame Format (FEFF), and the CAN XL frame format (XLFF). Therefore, CAN XL nodes can use data frames with an asymmetric differential mode only, as well as data frames with an asymmetric differential mode and symmetric differential mode.

However, existing CAN monitoring devices connected in-between CAN XL nodes cannot detect CAN XL data phases and do not switch transceiver modes. Thus, existing CAN monitoring devices are unable to monitor CAN XL nodes and therefore cannot perform diagnostic functions on a CAN XL network. A monitoring device must accomplish transceiver mode switching of a plurality of CAN XL transceivers between different modes at the same time. Existing CAN XL nodes (e.g., CAN XL transceiver+CAN XL protocol controller) do not facilitate the foregoing either. Therefore, there exists a need for a monitoring device/ method that can monitor CAN XL nodes in order to identify and address CAN XL node faults.

BRIEF DESCRIPTION OF DRAWINGS

FIGS. 2A and 2B are block diagrams of exemplary system CAN Electronic Control Units (ECUs) in accordance with one or more embodiments described herein.

FIGS. 6A-6H are block diagrams of exemplary transition detection protocols in accordance with one or more embodiments described herein.

SUMMARY

Figure 1:
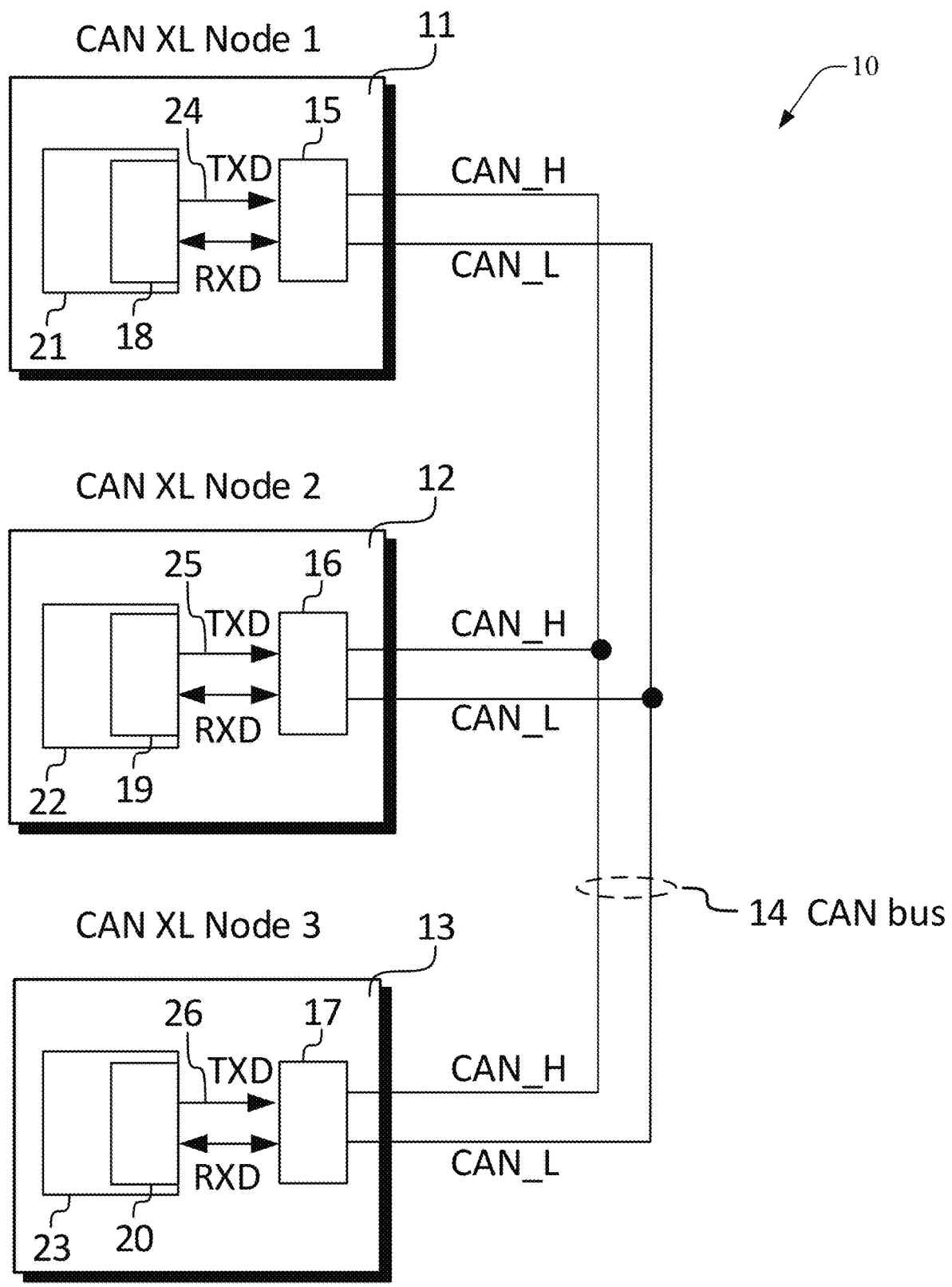
FIG. 1 is a block diagram of a CAN network comprising CAN XL nodes in accordance with one or more embodiments described herein.

Embodiments herein can detect unique sequences of zero, negative, and/or positive voltages in a data frame from CAN XL nodes. A start and an end of a CAN XL data phase can be detected and used for switching operation mode of multiple transceivers. Transceivers herein can be switched between different modes, depending on which CAN bus a data frame is received from, and to which CAN bus(es) the frame is to be forwarded. Embodiments herein are also legacy-compatible, and thus CAN Classic and CAN FD communication can be facilitated and/or managed.

Embodiments herein need not comprise one or more complex devices as CAN XL protocol controllers. Consequently, costs of a CAN XL monitoring device can be reduced. Embodiments herein can utilize CAN XL protocol specifications without modifications to CAN XL protocol specifications. In this regard, embodiments herein are fully compatible with CAN XL nodes that comply with CAN XL protocol specifications.

Embodiments herein need not determine the exact data frame format. Such embodiments do not need to determine or understand (before receiving a CAN XL data frame) where/when a data phase of the CAN XL data frame starts/ends. Thus, any length of a data phase is supported herein (e.g., less than or even beyond 2048 payload bytes of currently defined XLFF frame format of CAN XL). In this regard, future specifications (e.g., beyond CAN XL) are supported.

According to an embodiment, a method can comprise determining, by a device comprising a processor, a transition between an arbitration phase of a Controller Area Network (CAN) XL node of a group of communicatively coupled CAN XL nodes of a CAN bus network and a data phase of the CAN XL node based on a voltage change of a voltage level of the CAN XL node being determined, by device, to satisfy a defined voltage change criterion of defined voltage criteria, wherein the data phase comprises both positive voltages and negative voltages, and in response to determining the transition, routing, by the device, dominant data or logic 0/1 of the CAN XL nodes to other nodes of the group of CAN XL nodes.

It is noted that the arbitration phase comprises an asymmetric differential bus mode and wherein the data phase comprises a symmetric differential bus mode. According to an embodiment, the transition can occur within a defined amount of time.

In one or more embodiments, the transition comprises a transition from the arbitration phase to the data phase, and wherein positive voltage of the data phase is smaller than positive voltage of the arbitration phase. According to an example, the transition comprises a first voltage of the voltage level comprising positive voltage larger than a first voltage threshold succeeded by a second voltage of the voltage level comprising negative voltage larger than a second voltage threshold. In another example, the transition comprises a first voltage of the voltage level comprising positive voltage larger than a first voltage threshold succeeded by a second voltage of the voltage level comprising a positive voltage between a second voltage threshold and a third voltage threshold. In another example, the transition comprises a first voltage of the voltage level comprising zero volts succeeded by a second voltage of the voltage level comprising a negative voltage larger than a negative voltage threshold. In yet another example, the transition comprises a first voltage of the voltage level comprising zero volts succeeded by a second voltage of the voltage level comprising a positive voltage between a first positive voltage threshold and a second positive voltage threshold.

In another embodiment, the transition comprises a transition from the data phase to the arbitration phase, and wherein positive voltage of the data phase is smaller than positive voltage of the arbitration phase. According to an example, the transition comprises a first voltage of the voltage level comprising a negative voltage larger than a first negative voltage threshold succeeded by a second voltage larger than a first positive voltage threshold. In another example, the transition comprises a first voltage of the voltage level comprising a positive voltage between a first positive voltage threshold and a second positive voltage threshold succeeded by a second voltage above the first positive voltage threshold. In another example, the transition comprises a first voltage of the voltage level comprising a negative voltage larger than a first negative voltage threshold succeeded by a second voltage comprising zero volts. In yet another example, the transition comprises a first voltage of the voltage level between a first positive voltage threshold and a second positive voltage threshold succeeded by a second voltage comprising zero volts.

In another embodiment, a monitoring device can comprise a transceiver that determines a transition between an arbitration phase of a Controller Area Network (CAN) XL node of a group of communicatively coupled CAN XL nodes of a CAN bus network and a data phase of the CAN XL node based on a voltage change of a voltage level of the CAN XL node being determined to satisfy a defined voltage change criterion of defined voltage criteria, wherein the data phase comprises both positive voltages and negative voltages, and a mode router that, in response to determining the transition, routes dominant data or logic 0/1 data of the CAN XL nodes to other nodes of the group of CAN XL nodes.

It is noted that, according to a nonlimiting embodiment, the arbitration phase only utilizes zero or positive differential bus voltage, the data phase only utilizes positive or negative voltage differential bus, and the data phase does not utilize zero differential bus voltage.

In an embodiment, the mode router, in response to the transceiver determining the transition, further routes a mode switch request from the transceiver for a switch from a first transceiver bus mode to a second transceiver bus mode to one or more transceivers of the other nodes.

According to an embodiment, the first transceiver bus mode comprises an asymmetric differential arbitration phase mode and wherein the second transceiver bus mode comprises a symmetric differential data phase mode.

In another embodiment, the first transceiver bus mode comprises a symmetric differential data phase mode and wherein the second transceiver bus mode comprises an asymmetric differential arbitration phase mode.

In yet another embodiment, a non-transitory machine-readable medium can comprise executable instructions that, when executed by a processor, facilitate performance of operations, comprising determining a transition between an arbitration phase of a Controller Area Network (CAN) XL node of a group of communicatively coupled CAN XL nodes of a CAN bus network and a data phase of the CAN XL node based on a voltage change of a bus voltage level of the CAN XL node being determined to satisfy a defined voltage change criterion of defined voltage criteria, wherein the data phase comprises both positive voltages and negative voltages, and in response to determining the transition, routing dominant data or logic 0/1 data of the CAN XL nodes to other nodes of the group of CAN XL nodes.

It is noted that, in an embodiment, the arbitration phase only utilizes zero or positive differential bus voltage, the data phase only utilizes positive or negative differential bus voltage, and the data phase does not utilize zero differential voltage.

DETAILED DESCRIPTION

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Turning now to FIG. 1, there is illustrated an example, non-limiting CAN XL network 10 comprising CAN XL nodes 11, 12, and 13 (collectively the CAN XL nodes). The CAN XL nodes can be connected to a CAN bus 14 (e.g., a two-wire CAN bus). Each CAN XL node 11, 12, or 13 can comprise a CAN XL transceiver (e.g., CAN XL transceiver 15, 16, and 16 respectively), a CAN XL protocol controller (e.g., CAN XL protocol controller 18, 19, and 20 respectively) which can facilitate protocol bit stream reception and transmission on data link layer according to ISO 11898-1, and host (e.g., application software running on microcontroller 21, 22, and 23 respectively). A microcontroller 21, 22, or 23 can be connected to the respective CAN XL protocol controller 18, 19, 20. According to an embodiment, the CAN XL protocol controllers can optionally be a part of the microcontrollers (e.g., 21, 22, or 23). Each CAN XL node 11, 12, and/or 13 can comprise therein a bus interface circuit (e.g., a CAN XL transceiver 15, 16, or 17, respectively).

CAN XL nodes 11, 12, and/or 13 can be connected to a linear passive CAN bus 14. A CAN bus can comprise a multi-master serial communication bus which can comprise two physical wires: CAN_H and CAN_L, which can be connected to a respective terminal of each CAN node. All CAN nodes (e.g., ECUs) in a CAN XL network 10 can be connected to these two wires.

The CAN XL protocol can utilize a serial bit stream with logical values 0 and 1, also known as dominant and recessive bits during arbitration phase, and logic 0/1 in the data phase, that make up CAN XL frames and/or other protocol symbols transmitted over the CAN bus 14. In this regard, respective protocol controller and transceiver RXD/TXD signals handle data bit streams with logical values 0 and 1. However, on the CAN bus 14, the bits are represented by analog voltages or states associated with logic values are called dominant/recessive for the arbitration phase, and logic 0/1 for data phase.

All CAN XL nodes 11, 12, and 13 are capable of transmitting data frames to each other. The CAN XL protocol controllers 18, 19, and 20 can facilitate reception and/or transmission of CAN frames and error events. The transmitted bit values 0 and 1 from the CAN XL protocol controller 18, 19, or 20 can be converted in the CAN XL transceivers 15, 16, and/or 17 in each CAN XL node into four voltage levels (e.g., recessive and dominant states in the arbitration phase and a logic 0/1) on the CAN bus 14. In this regard, the recessive state is caused by recessive data being transmitted over the bus, while the dominant state is caused by dominant data being transmitted over the bus. These states relate to two voltage ranges on the CAN bus 14. The logic bus 0 state is caused by logic 0 data being transmitted on the bus, and logic 1 state is caused by logic 1 data being transmitted on the bus. These states relate to two further voltage ranges on the CAN bus 14. For reception, the opposite can occur: the CAN XL transceivers 15, 16, and/or 17 can convert the four voltage levels on the CAN bus 14 into suitable levels logic 0/1 to the CAN XL protocol controllers 18, 19, and/or 20.

All CAN XL nodes can comprise a wired-AND connection on CAN_H and CAN_L bus wires during an arbitration phase. In this regard, all CAN nodes can be directly connected to each other by connecting all the CAN_H wires, and all the CAN_L wires, respectively. Each CAN XL node 11, 12, and/or 13 can drive the CAN bus 14 into a series of recessive/dominant states or logic 0/1 states, thus enabling a multi-master communication network. The CAN protocol data link layer can define how this multi-master sharing of the network is performed (e.g., according to a collision detection multiple access (CDMA) operation).

A CAN database can be used, among other purposes, for associating CAN frame identifiers to each CAN XL node. The CAN database can be used as a base for implementation of the frame transmission and reception in each CAN XL node, as well as for analysis of the communication or runtime operations of the CAN XL nodes by connecting an optional CAN analysis tool. The CAN database can comprise a lookup table. In this regard, an identifier can be input, and the CAN XL node name is obtained as a result. A CAN XL identifier can comprise a unique characteristic in that it points to a specific CAN XL node as being the transmitter or receiver of a certain frame. Other CAN XL protocol items (e.g., Start-of-frame (SOF), acknowledge (ACK), error flag (EF), overload flag (OF)) do not uniquely associate with a CAN XL nodes since they are intentionally identical for all CAN XL nodes in that such events have no included identifier. The foregoing makes a CAN XL database useful only when an error event occurs that includes an identifier, and the identifier exist in the database. Further, the CAN XL database normally implies that any given identifier is only associated to one CAN XL node as the transmitter.

The CAN bus 14 interconnection of CAN XL nodes 11, 12, and/or 13 correspond to a "wired-AND" mechanism during an arbitration phase. Recessive bits (e.g., logic 1) can be overwritten by dominant bits (e.g., logic 0). In a recessive state, a dominant bit from any one or more CAN XL nodes can result in a dominant bus state. So long as no CAN XL nodes are sending a dominant bit, the CAN bus 14 will be in a recessive state.

Only the CAN XL node providing the highest differential bus voltage is the CAN XL node dominating the CAN bus voltage (Vdiff). This is the intended function of a CAN bus physical layer according to ISO 11898-2. During certain protocol events, more than one CAN bus 14 can drive the CAN bus into dominant state, for instance, for SOF, dominant bits of identifier during arbitration field, ACK, error flag, overload flag. When more than one CAN XL node is transmitting a dominant state at the same time, it cannot always be determined for each CAN XL node respectively, whether it is transmitting dominant data or recessive data. This can cause a dominant state and a recessive state on the bus, respectively, by analyzing bus voltage Vdiff, since all CAN nodes are directly connected to each other via the CAN bus. Determining this can be even more difficult if the dominant state output voltage from each CAN XL node is close to one other such that they cannot be reliably distinguished. This is not a problem in CAN communication for the ECUs, but adds difficulty to advanced CAN network analysis.

However, if analysis regarding whether the first CAN node XL or the second CAN XL node 12 (or both) are actually driving the CAN bus 14 into a dominant state, determining voltage on the CAN bus 14 can be difficult. It can be even more difficult to achieve a method that works for all CAN buses, in all vehicles, including all variables such as transceiver brand, age, temperature etc., since dominant state output voltage is permitted to vary by a factor 1:2 (+1.5V to +3.0V), and there can exist a distribution of voltages in which few ECUs have less Vdiff drive capability than other ECUs on the same CAN bus 14.

Further, analyzing the electrical current that each CAN XL node drives into the CAN bus 14, while at the same bit time transmitting dominant data, can be difficult since in principle, it is only the CAN node with the highest Vdiff drive capability that forces current. Alternatively, it is generally only the CAN nodes with highest Vdiff that actually forces a reliably measurable current to flow out of the transceiver CAN_H, through the termination components, impedance of the CAN wires, and back into the CAN_L wire of the CAN XL transceiver.

If it is required be analyzed, for instance, whether a first CAN XL node (e.g., CAN XL node 11) or a second CAN XL node (e.g., CAN XL node 12) (or both) is actually driving the CAN bus 14 into a dominant state, this cannot be determined in a reliable way by measuring the electrical current flow to/from the CAN XL transceiver 15 or 16 and the CAN bus.

FIG. 2 illustrates internal structures of CAN ECUs for CAN Classic+CAN FD (ECU 260 FIG. 2A) and CAN XL (ECU 270 FIG. 2B). ECU 260 can comprise a host (e.g., microcontroller) 265, CAN protocol controller 264, and CAN transceiver 266.

In a CAN Classic+CAN FD ECU 260, the RXD (data receive) pin for digital receive data is unidirectional. In CAN XL, the RXD pin is instead bidirectional, and thus requires a CAN XL protocol controller 274 to control the mode switching of CAN XL transceiver 276. To operate a CAN XL node, a CAN XL protocol controller 274 and a CAN XL transceiver 276 thus required.

Figure 3:
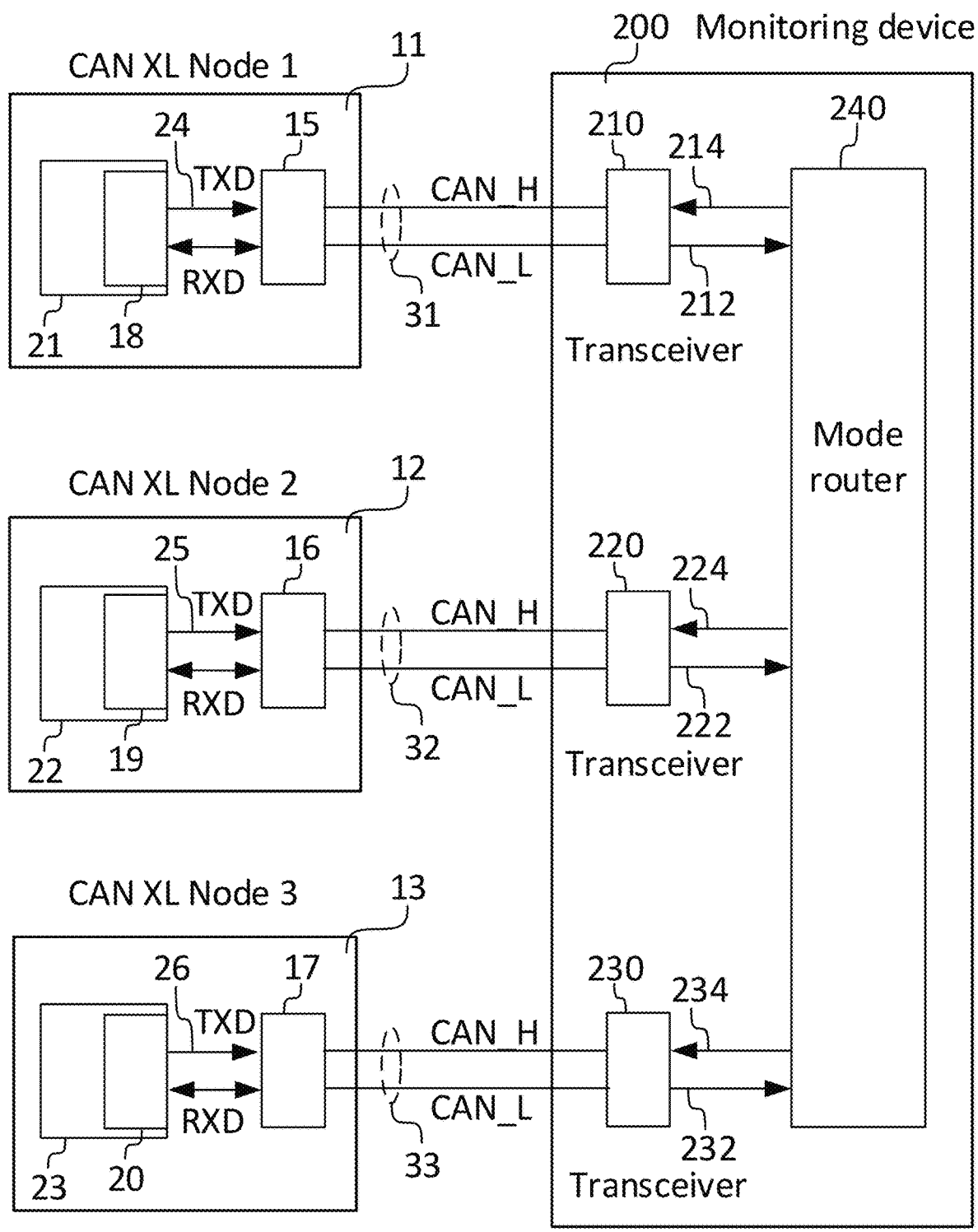
FIG. 3 is a block diagram of a CAN network comprising CAN XL nodes in accordance with one or more embodiments described herein.

With reference to FIG. 3, there is illustrated an exemplary monitoring device 200 in accordance with one or more embodiments described herein. The monitoring device 200 can be connected in-between CAN XL nodes 11, 12, and/or 13 in order to monitor the CAN XL nodes. The monitoring device 200 can comprise CAN transceivers 210, 220, and/or 230 which, according to an embodiment, are not standard CAN XL transceivers. Transceivers 212, 222, and/or 232 can detect arbitration and data phase mode changes without the use of a complex CAN XL protocol controller 274. Such phase mode changes can be forwarded over signals 214, 224, and/or 234 to mode router 240 for routing to other transceivers (e.g., 210, 220, and/or 230). According to an embodiment, at frame reception, all transceivers (e.g., 210, 220, and 230) must switch modes simultaneously. In this regard, one of the transceivers 210, 220, or 230 initiates a mode switch upon receiving a CAN XL data frame from a source CAN XL Node 11, 12 or 13. Such a switch request can be routed by mode router 240 to the other transceivers which are switched differently from a first transceiver. According to an embodiment, while the monitoring device 200 is illustrated as a hardware device in FIG. 3, it is also envisaged that the device can be implemented as a simulation model for simulating behavior of CAN nodes in the form of ECUs.

Embodiments herein can utilize CAN transceivers 210, 220, and/or 230 capable of measuring differential CAN bus voltage and detecting a CAN XL data phase by bus voltage. According to an embodiment, in all other phases of CAN XL frame and all phases of all other CAN formats, the CAN XL data phase is not detected. The bus voltage can be compared to a plurality of voltage thresholds to detect the data phase of CAN XL. CAN XL utilizes symmetric differential bus voltage at transmission of the data phase, which differs from CAN Classic and CAN FD. Bus voltages herein can be less than, equal to, or greater than voltage thresholds. Embodiments herein can utilize such bus voltages and thresholds to determine a start and end of a data phase.

According to an embodiment, routing of transceiver modes is performed among transceivers 210, 220, and 230. In one or more embodiments, and as illustrated in FIG. 3, router 240 can be connected between transceivers 210, 220, and/or 230 and protocol controller 250. Transceivers are interconnected in order to operate the monitoring device 200 comprising a plurality of transceivers. In FIG. 3, routing of messages controlling transceiver modes in/out and/or within the monitoring device 200 are depicted herein. According to an example, a CAN XL data frame can be received by transceiver 210 from CAN XL node 11 on CAN bus 31. On the RXD signal, the bit stream 1/0 is received and forwarded by router 240 to transceivers 220 and 230. The transceiver RXD/TXD signals can handle data bit streams with logical values 0 and 1.

Figure 4A:
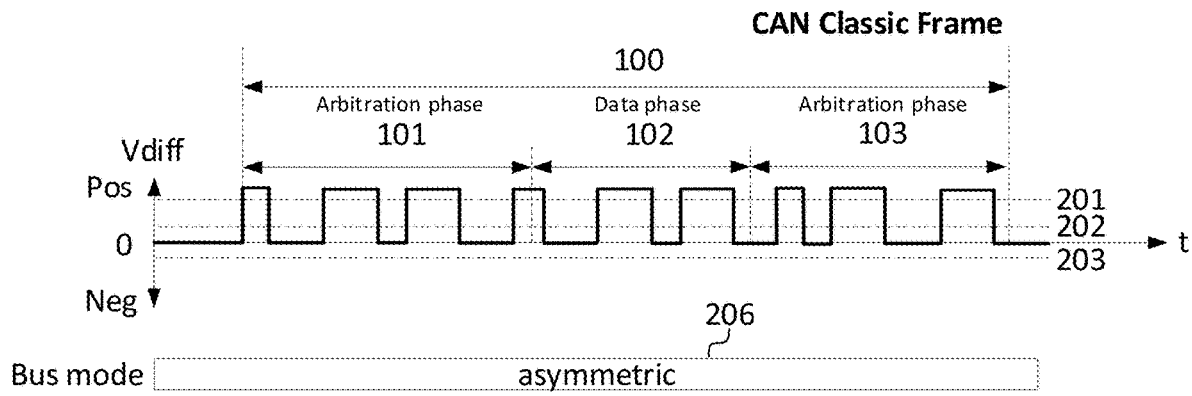
FIGS. 4A-4C are block diagrams of exemplary system CAN formats in accordance with one or more embodiments described herein.
Figure 4B:
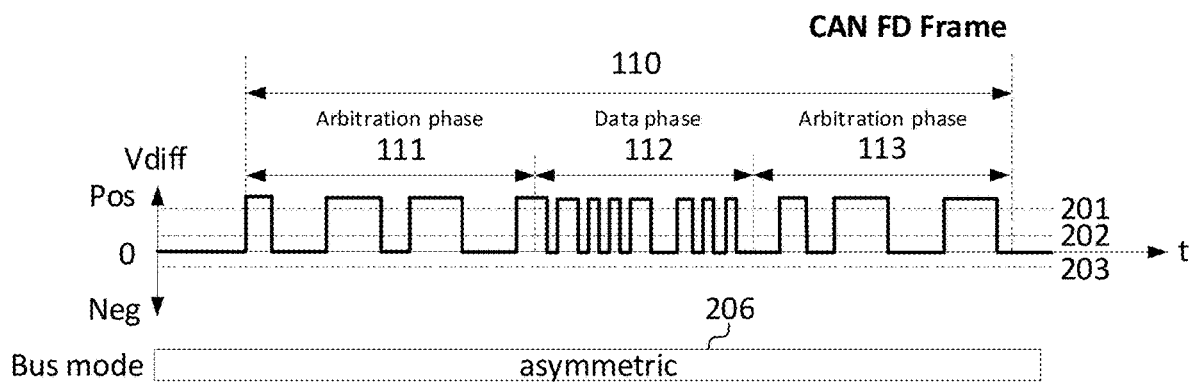
Figure 4C:
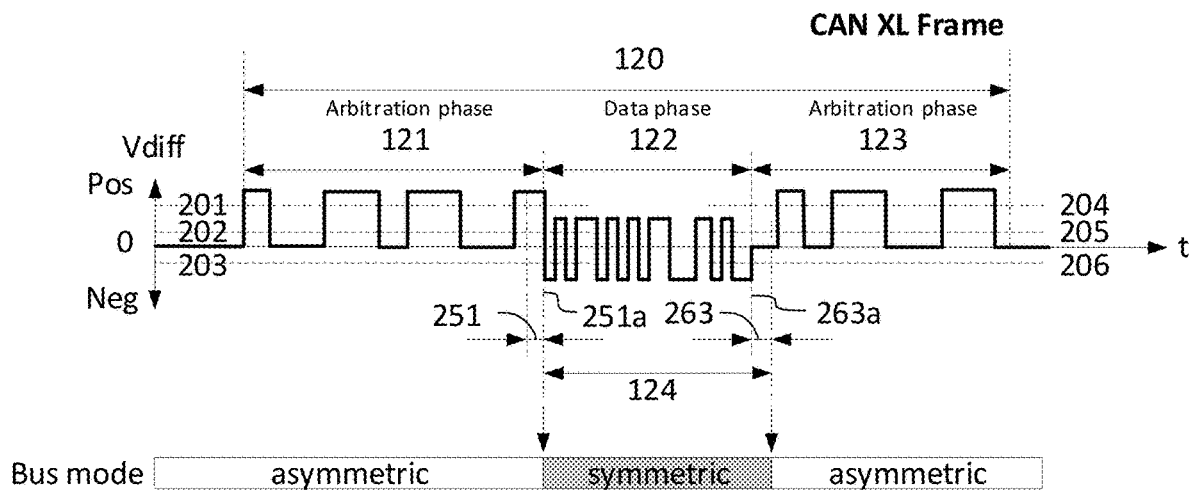

FIG. 4 illustrates differential bus voltages for data frames in various formats. For instance, FIG. 4A depicts CAN Classic 100, FIG. 4B depicts CAN FD 110, and FIG. 4C depicts CAN XL 120 along with associated voltage thresholds 201, 202, 203, 204, 205, and 206 (e.g., as utilized by transceiver 210, 220, and/or 230). According to an embodiment, thresholds 201, 202, and 203 can be utilized for CAN XL data phase start detection, and thresholds 204, 205, and 206 can be used for CAN XL data phase end detection (later discussed in greater detail). In some embodiments, threshold 201 is identical to threshold 204, 202 is identical to 205 and 203 is identical to 206. In a further embodiment, some or all thresholds are different.

According to an embodiment, a CAN XL frame can be transmitted (e.g., by CAN XL node 11 on CAN bus 31) and received by CAN XL transceiver 210 of the monitoring device 200). During arbitration phase 121 and 123, dominant data can be forwarded from transceivers 210 to 220 and 230, and further forwarded to CAN XL nodes 12 and 13. During the data phase interval 122, logic 0/1 data can be forwarded from transceivers 210 to 220 and 230, and further forwarded to CAN XL nodes 12 and 13.

In an exemplary CAN XL system 10, differential bus voltages on buses 31, 32, 33 can be according to the following: dominant bus voltage is approximately +2.0V, recessive bus voltage is approximately 0.0V, logic 0 bus voltage is approximately +1.0V and logic level 1 is approximately −1.0V. It is noted that the differential bus voltage can be defined as the voltage from wire CAN_H to system ground subtracted by voltage from wire CAN_L to system ground.

EXEMPLARY START DETECTION: according to an embodiment, during a minimum time interval 251, the bus voltage must exceed threshold 201 (e.g., a dominant bus state). At the event 251a, which is the start of data phase, the differential bus voltage becomes less than voltage threshold 203, and start of a CAN XL data phase is detected at 251a. At 251a, a transceiver mode request (e.g., from asymmetric to symmetric) becomes active from transceiver 210 and is signaled by symmetric mode to the mode router 240.

EXEMPLARY END DETECTION: according to an embodiment, at the event 264a, the voltage falls, and the end of a CAN XL data phase can be detected at end of 264 by the bus voltage rising from being above threshold 204 but below threshold 204 and settling between voltage thresholds 205 and 206 for a minimum time interval 264. At end of time interval 264, a transceiver mode request (e.g., from symmetric back to asymmetric) become active from transceiver 210 and is signaled by 212 to the mode router 240, and transceivers 220 and 230 are requested back to asymmetric mode.

The time interval 124 illustrates the time interval for which a symmetric mode request is signaled to mode router 240, and any backwards mode request from mode router 240 to transmitter part of transceiver 210 itself is blocked. According to an embodiment. before and after the time interval 124, there is no active symmetric mode request. During time interval 124, the mode router 240 forwards a symmetric transceiver mode request to other CAN transceivers 220 and 230. Any transceiver mode request (e.g., 214, 224, and/or 234) received by a CAN transceiver 210, 220, and/or 230 from the mode router 240 can concern switching the mode of the bus driver (e.g., transmitter) part of the other transceivers 210, 220, and/or 230. According to an embodiment, a request from transceiver 220 can concern switching transceivers 210 and 230, and a request from transceiver 230 can concern switching transceivers 210 and 220. A request for symmetric mode from any transceiver 210, 220, and/or 230 can override any request for asymmetric mode.

Figure 5:
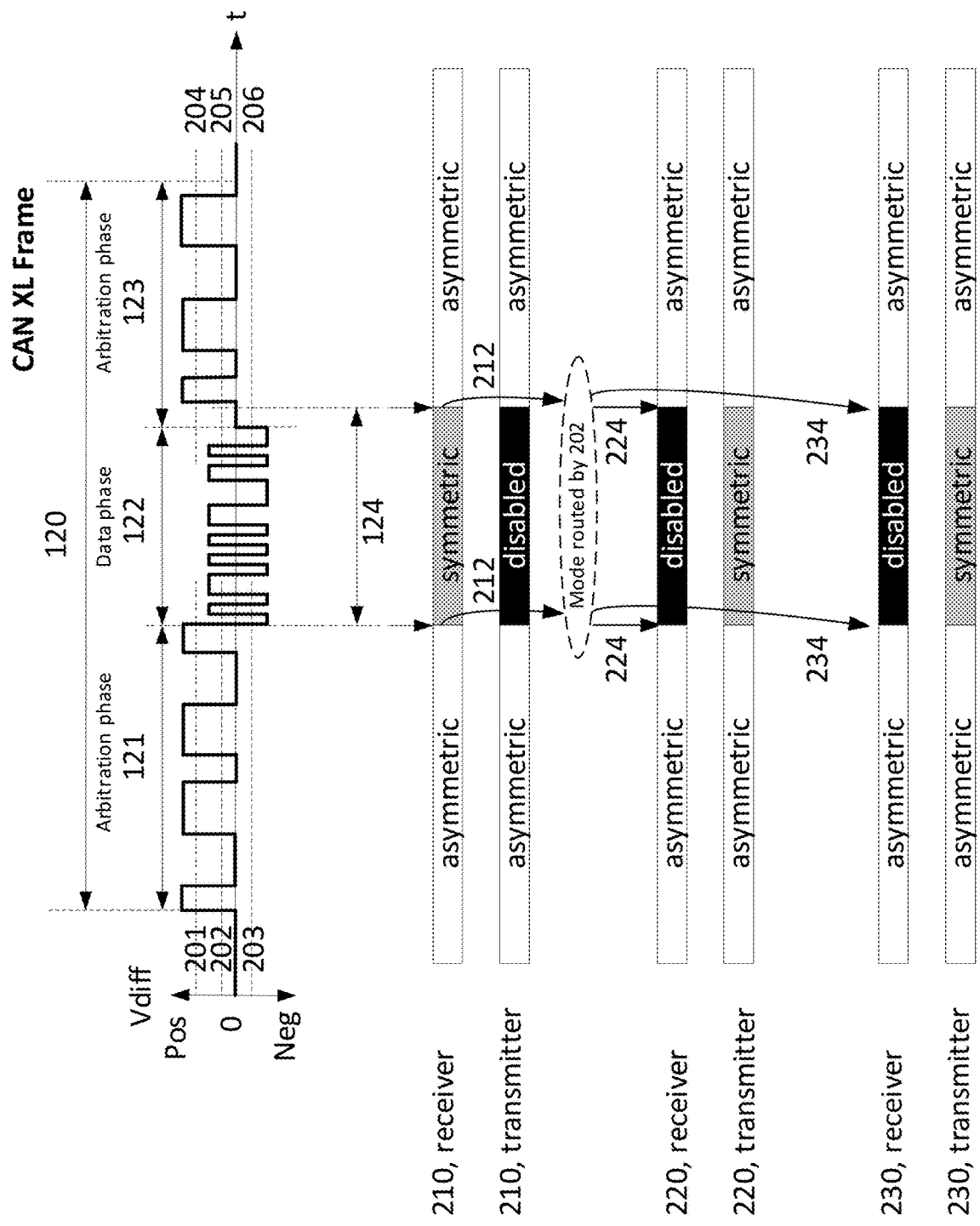
FIG. 5 is a block diagram of exemplary transceiver data phase detection, mode request, and mode routing in accordance with one or more embodiments described herein.

FIG. 5 further depicts routing of transceiver modes (e.g., within the monitoring device 200). A CAN XL data frame can be received by transceiver 210 from CAN XL node 11 on CAN bus 31. A corresponding data phase beginning can be detected at 251a, and a corresponding data phase end can be detected at 264a. The symmetric transmit mode request from 210 can be routed by mode router 240 to transceivers 220 and/or 230. It is noted that during the time interval 124 (e.g., a data phase), the transmission from transceiver 210 and reception from transceivers 220 and/or 230 can be disabled. It is noted that a CAN XL data phase can comprise an exclusive bus transmit access phase in which only one node or device must transmit. In this example, during the data phase interval 122, the CAN XL node 11 has exclusive transmit access to CAN bus 31. Consequently, therefore 210 must not transmit.

There exists a potential problem in that the monitoring device 200 could detect start of data phase on a bus for which the monitoring device 200 itself is forwarding a data phase to during 124. For example, the transceiver 220 could detect a data phase while forwarding a frame from CAN bus 31 to CAN bus 32. This undesired, because it could lead to all transceivers 210, 220, and/or 230 eventually switching to symmetric transmit mode on CAN buses 31, 32, and/or 33. This would violate the principle of one CAN XL node being granted exclusive bus transmit access during CAN XL data phase and a system comprising CAN XL nodes 11, 12, and 13 and monitoring device 200 would fail to properly transmit information. The following are two exemplary solutions to the aforementioned potential problem:

(1) once transceivers 220 and 230 are switched to the symmetric bus transmit mode, their receivers are disabled and thus blocked from detecting the start and end of the data phase that the transmitter parts of the transceivers create by their own transmissions.

(2) the mode router 240 only permits one symmetric mode request pass through it at any given time and blocks additional requests while a first request is still actively, or until an asymmetric mode request has passed it.

In an arbitration phase, the relation of transmit data bit stream signal TXD (transmit) and bus voltage is known. For instance, TXD=1 produces a zero bus voltage (recessive) and TXD=0 produce a positive bus voltage (dominant).

FIGS. 6A-6E illustrate various embodiments for bus voltage differentials in accordance with various embodiments herein, which can be utilized to determine a start or end of a data phase.

With the end of arbitration phase being one of two states (e.g., dominant or recessive) and the start of data phase being one of two states (e.g., logic 0-positive or logic 1-negative), the start of data phase can occur in one of four potential ways as illustrated in FIGS. 6A-6D. Similarly, the end of a data phase can occur in one of four potential ways as illustrated in FIGS. 6E-6H. According to an embodiment, the start and end types for data phases are common (e.g., one start type and one end type utilized exclusively or repeatedly in a CAN XL system).

Figure 6A:
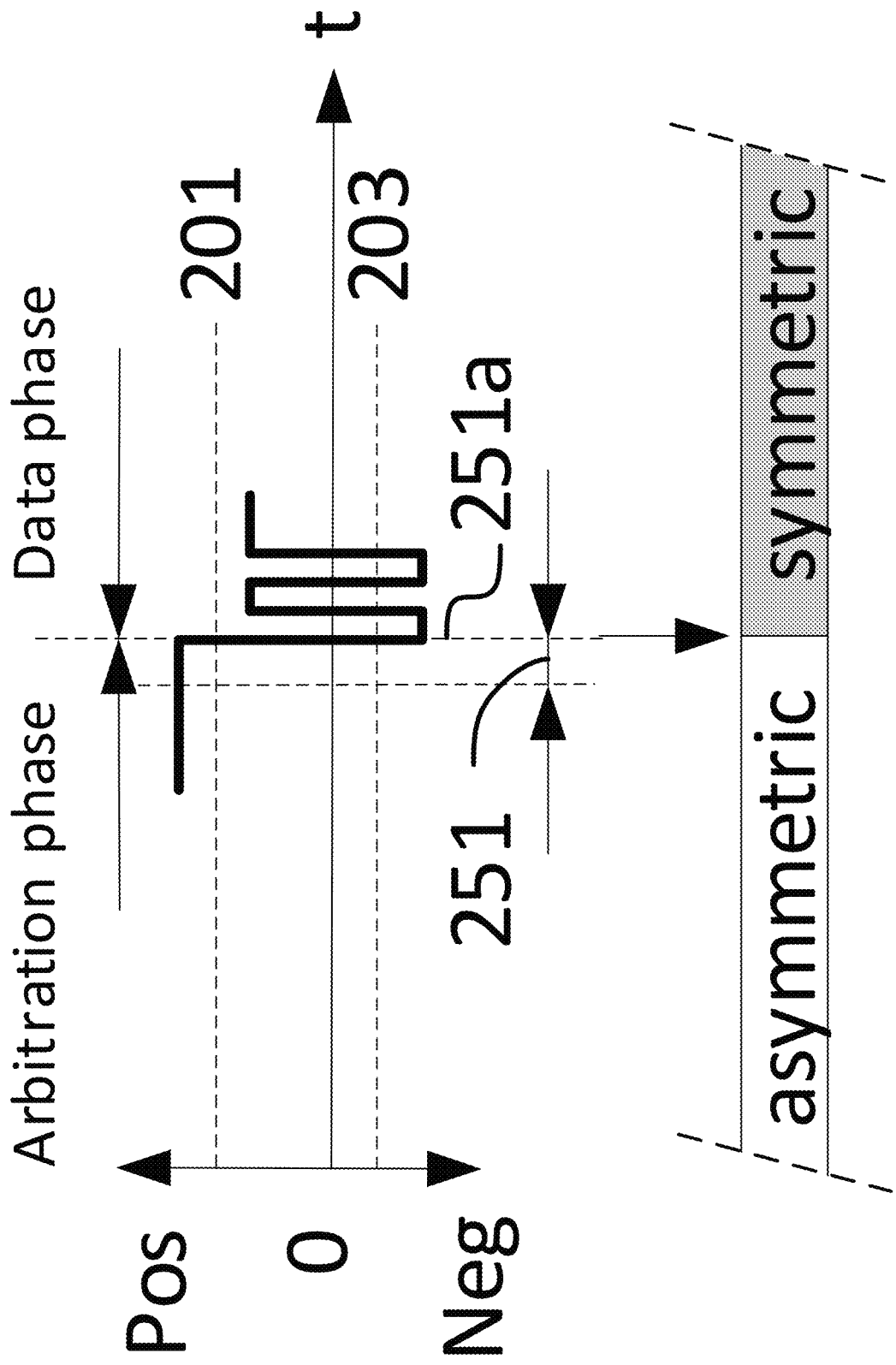

FIG. 6A illustrates a start of a data phase (e.g., a transition from an arbitration phase to a data phase). It is noted that threshold 201 can comprise a first voltage threshold and threshold 203 can comprise a second voltage threshold. In this regard, a positive voltage level can exceed the threshold 201 and can be immediately succeeded by a voltage level exceeding the threshold 203. In this regard, a voltage level (e.g., a first voltage of the voltage level) above threshold 201 can be succeeded by a voltage level (e.g., a second voltage of the voltage level) below threshold 203. According to an embodiment, threshold 201 can comprise +1.5V, and threshold 203 can comprise −0.3V. A voltage level transition that corresponds to the foregoing can represent a change from an arbitration phase to a data phase. In an embodiment, the transition from the first voltage to the second voltage can occur within a defined amount of time (e.g., within an interval 251) in order to correspond to a transition. According to an embodiment, the interval 251 can comprise 0.5 µs, though other suitable intervals can be utilized. In a further embodiment, the second voltage level can be succeeded by a third voltage level. The third voltage level can be between zero volts and the voltage threshold 201.

Figure 6B:
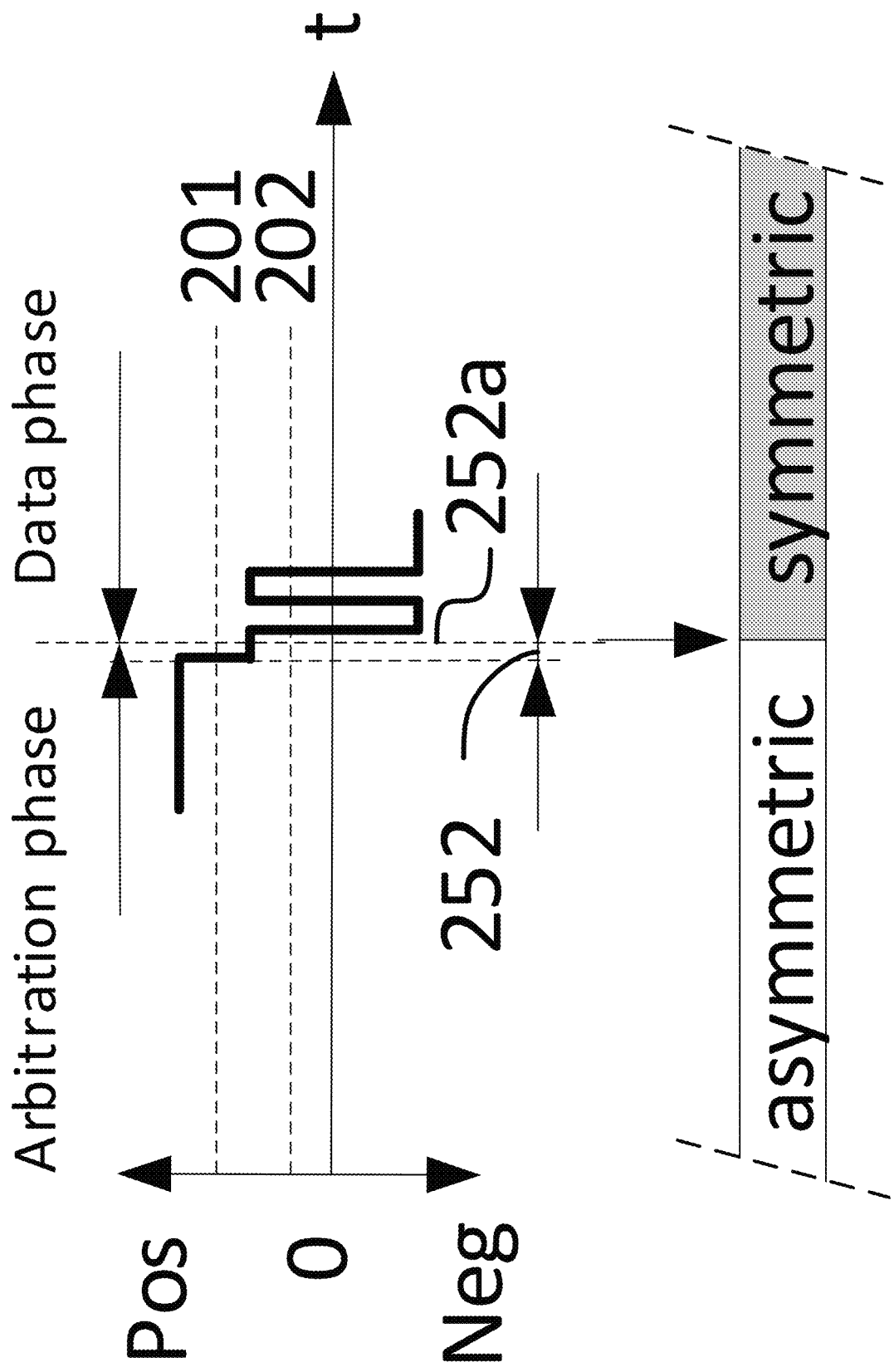

FIG. 6B illustrates a start of a data phase (e.g., a transition from an arbitration phase to a data phase). It is noted that threshold 201 can comprise a first voltage threshold and threshold 202 can comprise a second voltage threshold. In this regard, a positive voltage level can exceed the threshold 201 and can be immediately succeeded by a voltage level between the threshold 201 and the threshold 202. In this regard, a voltage level (e.g., a first voltage of the voltage level) above threshold 201 can be succeeded by a voltage level (e.g., a second voltage of the voltage level) between threshold 201 and threshold 202. According to an embodiment, threshold 201 can comprise +1.5V, and threshold 203 can comprise +0.3V. A voltage level transition that corresponds to the foregoing can represent a change from an arbitration phase to a data phase. In an embodiment, the transition from the first voltage to the second voltage can occur within a defined amount of time (e.g., within an interval 252) in order to correspond to a transition. According to an embodiment, the interval 252 can comprise 25 ns, though other suitable intervals can be utilized. In a further embodiment, the second voltage level can be succeeded by a third voltage level. The third voltage level can comprise a negative voltage.

Figure 6C:
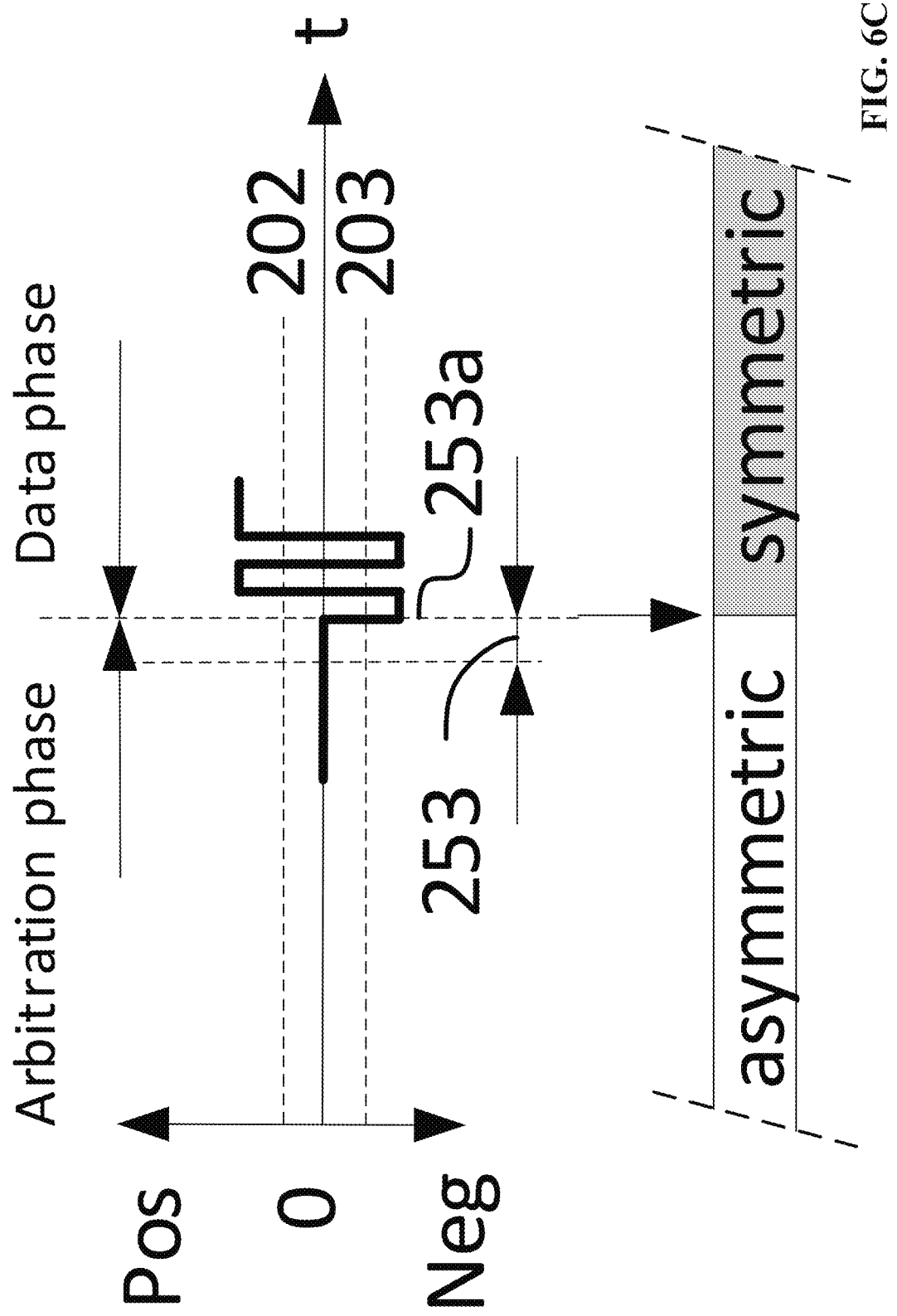

FIG. 6C illustrates a start of a data phase (e.g., a transition from an arbitration phase to a data phase). It is noted that threshold 203 can comprise a negative voltage threshold. In this regard, a voltage level of zero volts can be immediately succeeded by a voltage level exceeding the threshold 203. In this regard, a voltage level (e.g., a first voltage of the voltage level) of zero volts can be succeeded by a voltage level (e.g., a second voltage of the voltage level) below threshold 203. According to an embodiment threshold 203 can comprise −0.3V. A voltage level transition that corresponds to the foregoing can represent a change from an arbitration phase to a data phase. In an embodiment, the transition from the first voltage to the second voltage can occur within a defined amount of time (e.g., within an interval 253) in order to correspond to a transition. According to an embodiment, the interval 253 can comprise 0.5 µs, though other suitable intervals can be utilized. In a further embodiment, the second voltage level can be succeeded by a third voltage level. The third voltage level can be greater than the voltage threshold 202.

Figure 6D:
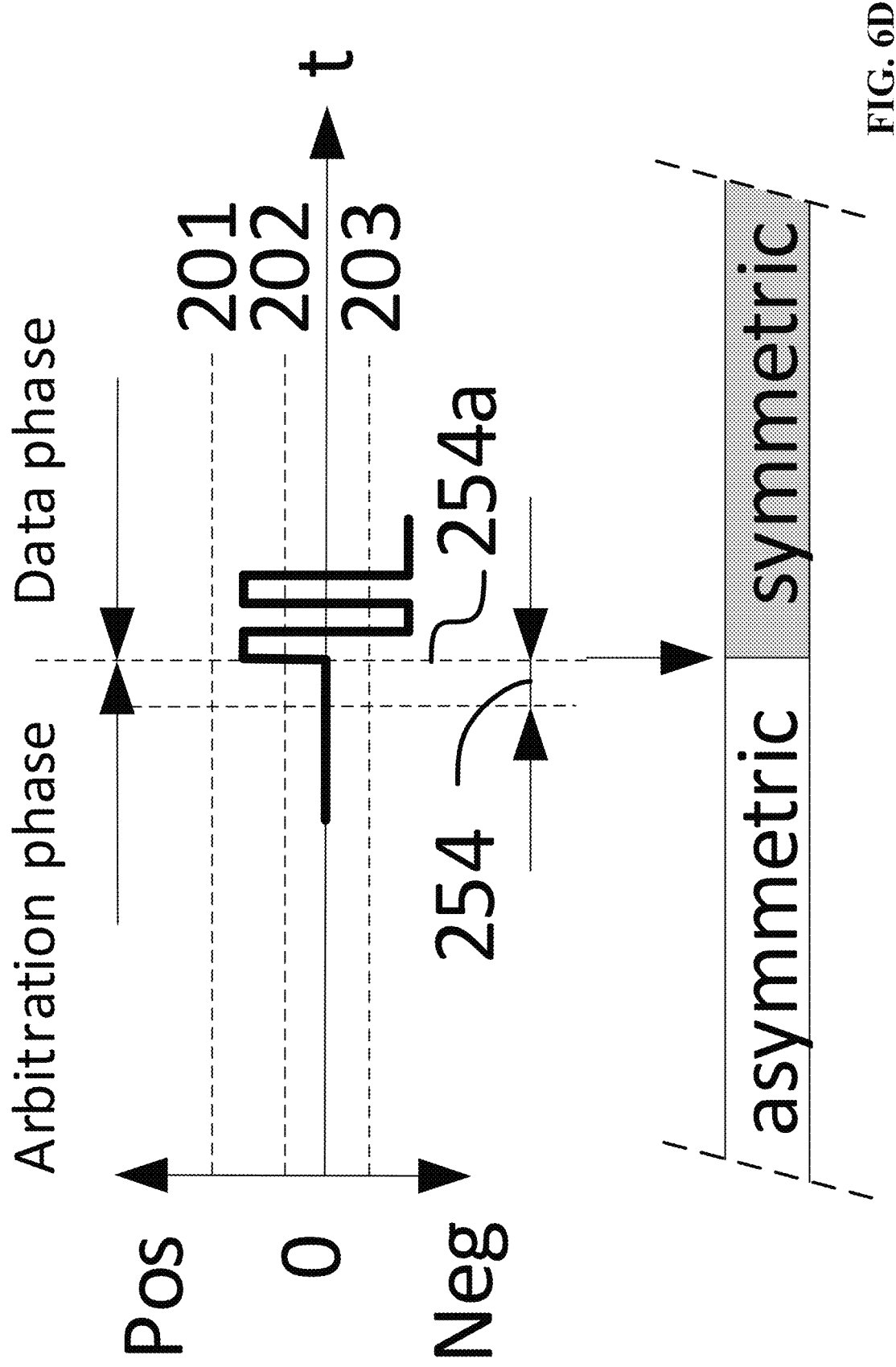

FIG. 6D illustrates a start of a data phase (e.g., a transition from an arbitration phase to a data phase). It is noted that threshold 201 can comprise a first voltage threshold and threshold 202 can comprise a second voltage threshold. In this regard, a voltage level of zero volts can be immediately succeeded by a voltage level between the threshold 201 and the threshold 202. In this regard, a voltage level (e.g., a first voltage of the voltage level) above threshold 201 can be succeeded by a voltage level (e.g., a second voltage of the voltage level) between threshold 201 and threshold 202. According to an embodiment, threshold 201 can comprise +1.5V, and threshold 202 can comprise +0.3V. A voltage level transition that corresponds to the foregoing can represent a change from an arbitration phase to a data phase. In an embodiment, the transition from the first voltage to the second voltage can occur within a defined amount of time (e.g., within an interval 254) in order to correspond to a transition. According to an embodiment, the interval 254 can comprise 0.5 µs, though other suitable intervals can be utilized. In a further embodiment, the second voltage level can be succeeded by a third voltage level. The third voltage level can be lower than the threshold 203.

FIG. 6E illustrates an end of a data phase (e.g., a transition from a data phase to an arbitration phase). It is noted that threshold 206 can comprise a first voltage threshold and threshold 204 can comprise a second voltage threshold. In this regard, a negative voltage level can exceed the threshold 206 and can be immediately succeeded by a positive voltage level exceeding the threshold 204. In this regard, a voltage level (e.g., a first voltage of the voltage level) below threshold 206 can be succeeded by a voltage level (e.g., a second voltage of the voltage level) above threshold 204. According to an embodiment, threshold 204 can comprise +1.5V, and threshold 206 can comprise −0.3V. A voltage level transition that corresponds to the foregoing can represent a change from a data phase to an arbitration phase. In an embodiment, the transition from the first voltage to the second voltage can occur within a defined amount of time (e.g., within an interval 261) in order to correspond to a transition. According to an embodiment, the interval 261 can comprise 0.5 µs, though other suitable intervals can be utilized. In a further embodiment, the second voltage level can be succeeded by a third voltage level. The third voltage level can comprise zero volts.

FIG. 6F illustrates an end of a data phase (e.g., a transition from a data phase to an arbitration phase). It is noted that threshold 206 can comprise a first negative voltage threshold, threshold 204 can comprise a first positive voltage threshold, and threshold 205 can comprise a second positive voltage threshold. In this regard, a positive voltage level between the threshold 204 and threshold 205 can be immediately succeeded by a positive voltage level above the threshold 204. In this regard, a voltage level (e.g., a first voltage of the voltage level) between the threshold 204 and threshold 205 can be succeeded by a voltage level (e.g., a second voltage of the voltage level) above the threshold 204. According to an embodiment, threshold 204 can comprise +1.5V, threshold 205 can comprise +0.3V, and threshold 206 can comprise −0.3V. A voltage level transition that corresponds to the foregoing can represent a change from a data phase to an arbitration phase. In an embodiment, the transition from the first voltage to the second voltage can occur within a defined amount of time (e.g., within an interval 262) in order to correspond to a transition. According to an embodiment, the interval 262 can comprise 0.5 µs, though other suitable intervals can be utilized. In a further embodiment, the second voltage level can be succeeded by a third voltage level. The third voltage level can comprise zero volts.

Figure 6G:
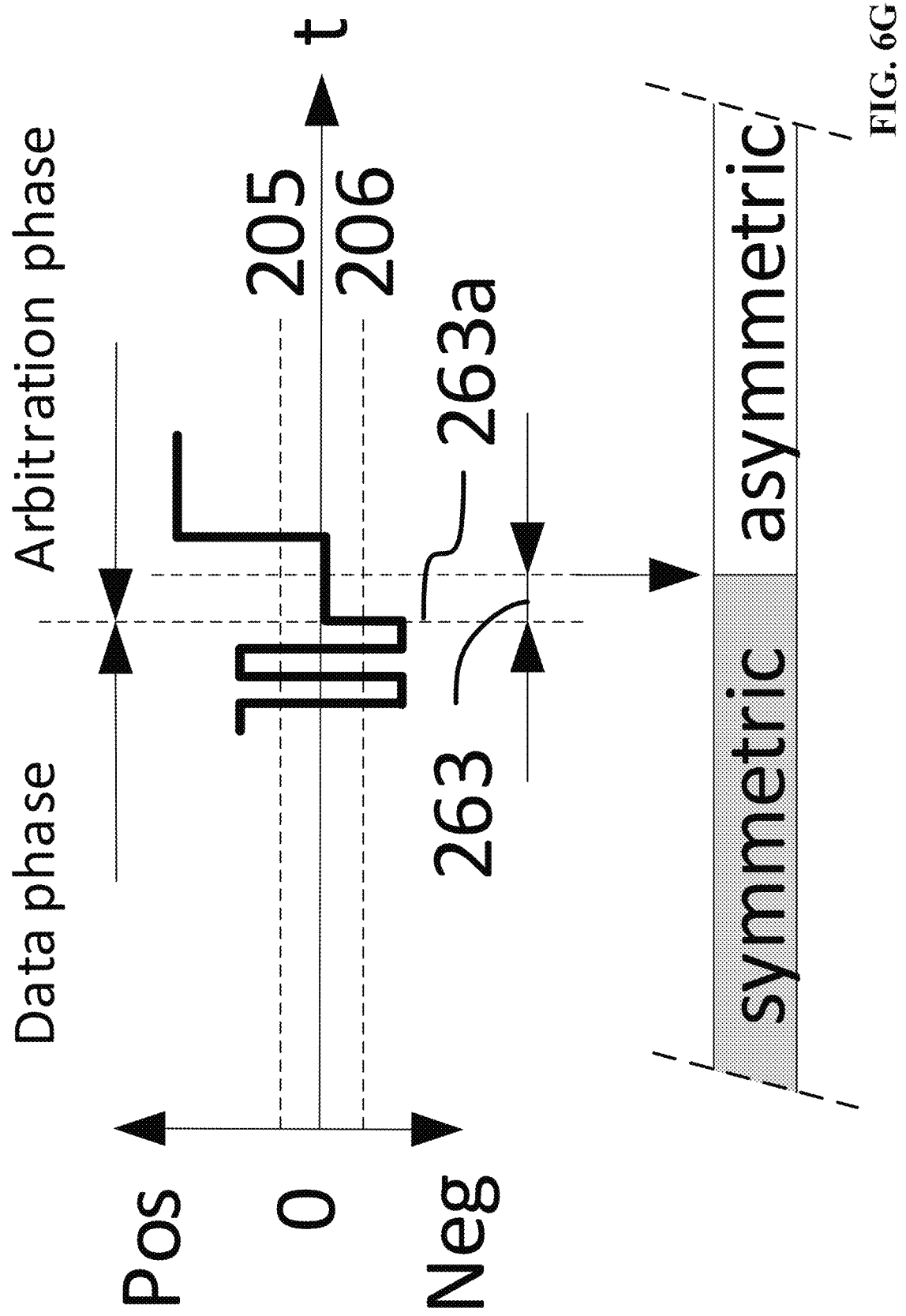

FIG. 6G illustrates an end of a data phase (e.g., a transition from a data phase to an arbitration phase). It is noted that threshold 206 can comprise a first voltage threshold and threshold 205 can comprise a second voltage threshold. In this regard, a negative voltage level can exceed the threshold 206 and can be immediately succeeded by a voltage level of zero volts. In this regard, a voltage level (e.g., a first voltage of the voltage level) below threshold 206 can be succeeded by a voltage level (e.g., a second voltage of the voltage level) of zero volts. According to an embodiment, threshold 206 can comprise −0.3V, and threshold 205 can comprise +0.3V. A voltage level transition that corresponds to the foregoing can represent a change from a data phase to an arbitration phase. In an embodiment, the transition from the first voltage to the second voltage can occur within a defined amount of time (e.g., within an interval 263) in order to correspond to a transition. According to an embodiment, the interval 263 can comprise 0.5 μs, though other suitable intervals can be utilized. In a further embodiment, the second voltage level can be succeeded by a third voltage level. The third voltage level can comprise a voltage level above threshold 205.

Figure 6H:
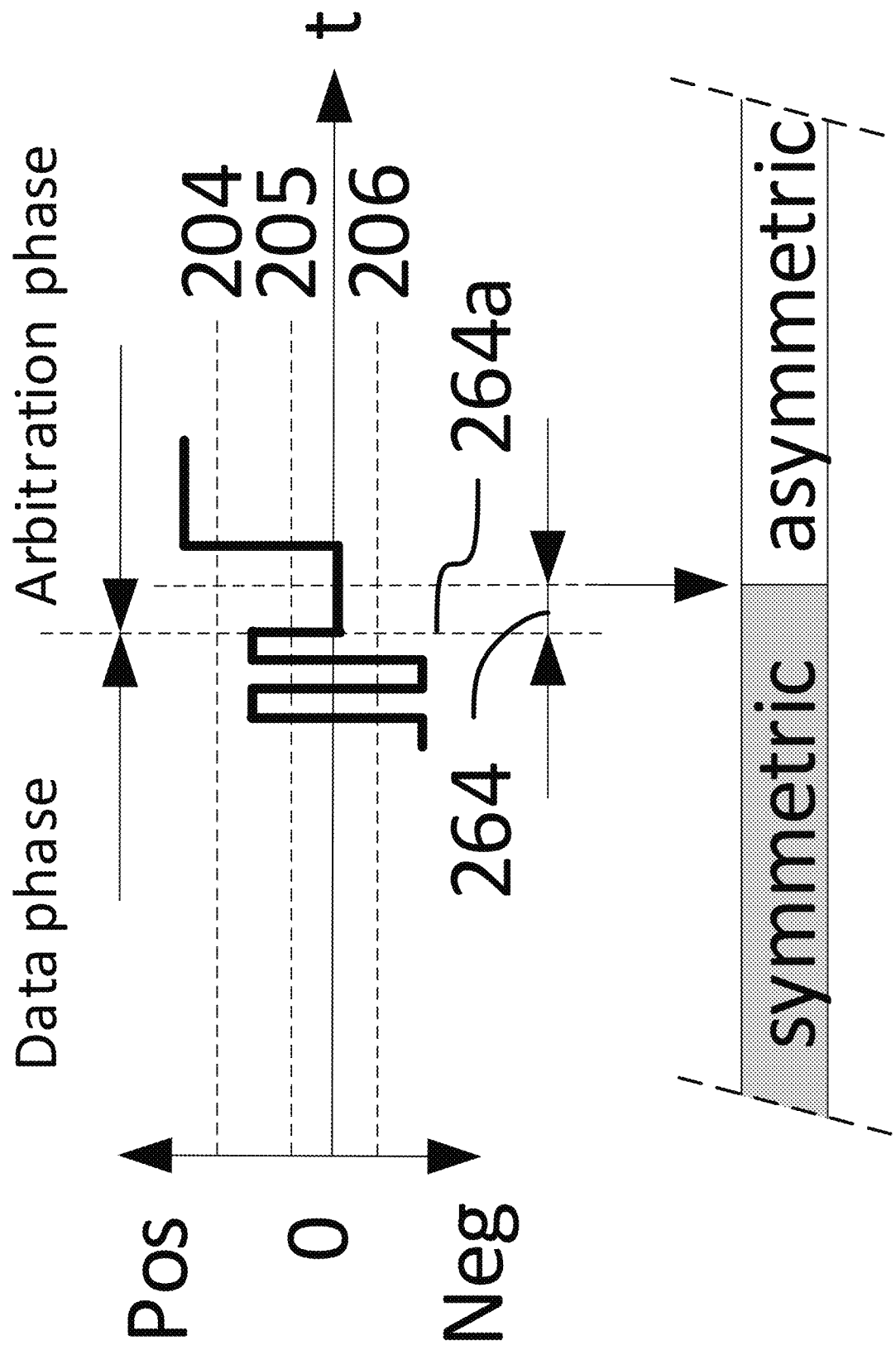

FIG. 6H illustrates an end of a data phase (e.g., a transition from a data phase to an arbitration phase). It is noted that threshold 206 can comprise a first negative voltage threshold, threshold 204 can comprise a first positive voltage threshold, and threshold 205 can comprise a second positive voltage threshold. In this regard, a positive voltage level between the threshold 204 and threshold 205 can be immediately succeeded by a voltage level of zero volts. In this regard, a voltage level (e.g., a first voltage of the voltage level) between the threshold 204 and threshold 205 can be succeeded by a voltage level (e.g., a second voltage of the voltage level) of zero volts. According to an embodiment, threshold 204 can comprise +1.5V, threshold 205 can comprise +0.3V, and threshold 206 can comprise −0.3V. A voltage level transition that corresponds to the foregoing can represent a change from a data phase to an arbitration phase. In an embodiment, the transition from the first voltage to the second voltage can occur within a defined amount of time (e.g., within an interval 264) in order to correspond to a transition. According to an embodiment, the interval 264 can comprise 0.5 μs, though other suitable intervals can be utilized. In a further embodiment, the second voltage level can be succeeded by a third voltage level. The third voltage level can comprise a voltage level above threshold 204.

As discussed above, at start detection, one or more voltage thresholds 201, 202, and/or 203 can be utilized and at end detection, one or more voltage thresholds 204, 205, and/or 206 can be utilized depending on the prescribed method in the CAN XL protocol (e.g., as illustrated in one or more of FIGS. 6A, 6B, 6C, 6D, 6E, 6F, and/or 6H).

According to an embodiment, intervals 262, 263, and/or 264 can comprise time intervals for which voltage must settle (e.g., with thresholds 201-206) for a minimum time to detect end of a data phase. In this regard, time intervals 251, 252, 253, 254, 261, 262, 263, and/or 264 can be utilized as partial conditions for data phase start and end detection. It is noted that complementing voltage conditions with time conditions within the data phase adds robustness to embodiments herein. In this regard, implementation of time conditions can help to avoid incorrect detections of voltage transitions. In this regard, it is noted that an automotive CAN system can be a harsh electrical environment prone to disturbances or electromagnetic interference (EMI), thus yielding an opportunity for time conditions to account for such EMI.

According to an embodiment, a bit rate of an arbitration phase can be 500 kilobits per second, which can comprise an associated bit duration of 2 μs. In an embodiment, the bit rate of data phase can be 10 megabits per second, which can comprise an associated bit duration of 100 ns. Consequently, a suitable value for time intervals 251, 253, 254, and/or 261-264 can comprise 0.5 μs, which can be in-between the bit duration of arbitration phase and data phase. According to an embodiment. a suitable value for time interval 252 can comprise 25 ns, which can provide afford response time of the complete mode router 240, especially for data phase end detection, so transceivers 210, 220, and/or 230 can be switched well before the sampling point of 2 μs or 100 ns bit time of the first bit of the phase directly after a previous phase. According to an embodiment, for start detection, intervals 251, 253, and/or 254 must be shorter than 2 μs, and intervals 252 and 261-264 must be shorter than 100 ns.

Embodiments herein can utilize any byte length of the data phase, such as 1-2048 bytes in the data phase or other byte lengths. It is noted that one or more embodiments herein can detect the actual start and end, so starts/ends of data phases of any number of bytes can still be detected.

According to an embodiment, when none of the CAN transceiver 210, 220, or 230 detect a CAN XL data phase, all transceivers 210, 220, and/or 230 of the monitoring device 200 can operate in an asymmetric bus mode.

Figure 7:
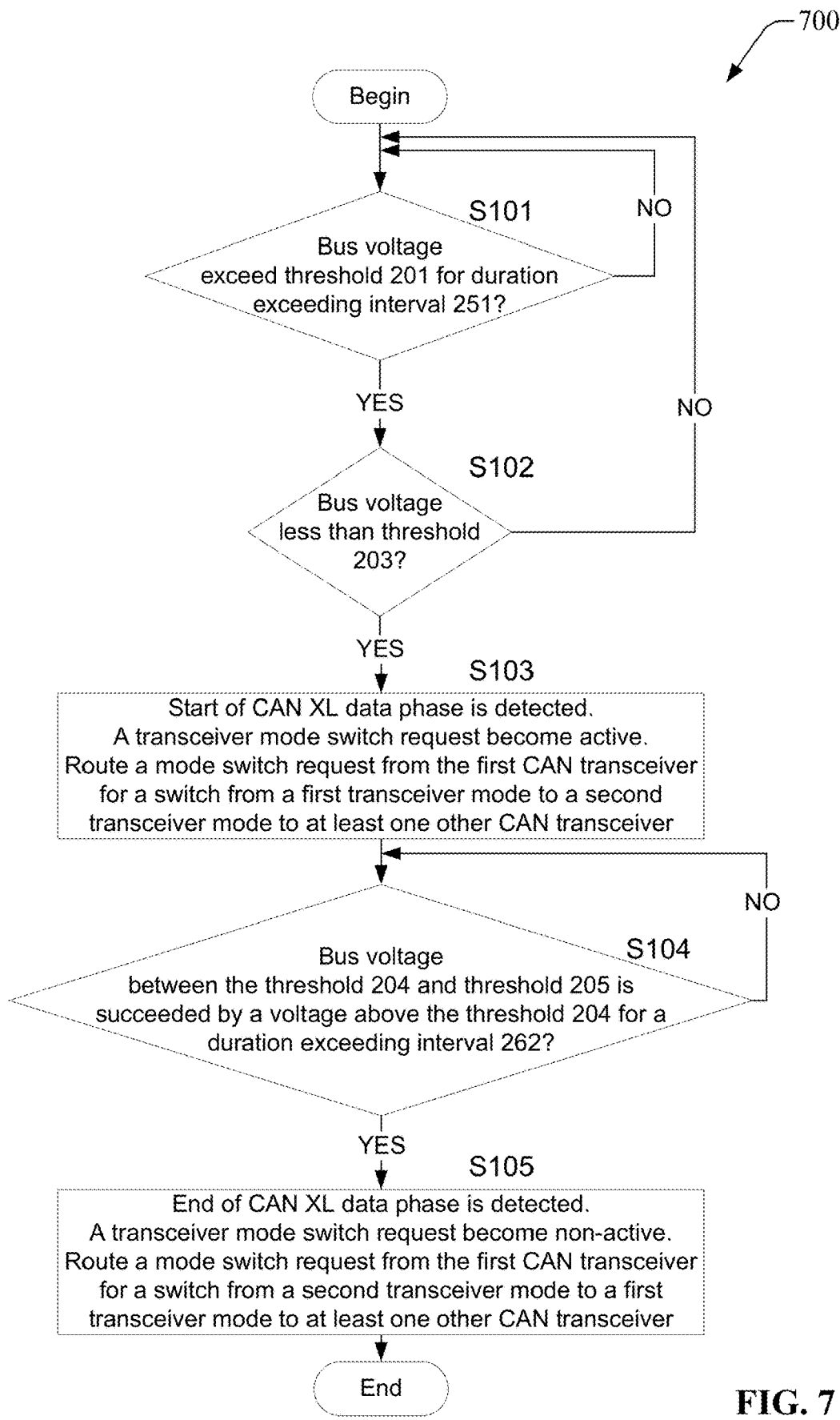
FIG. 7 is a flowchart of an example method for detecting a CAN XL data phase and routing a mode switch in accordance with one or more embodiments described herein.

FIG. 7 is a flowchart of an exemplary process 700 for detecting a CAN XL data phase and routing a mode switch in accordance with one or more embodiments herein. It is noted that, while FIG. 7 comprises a combination of the transition detections depicted in FIG. 6A and FIG. 6F, any combination of FIGS. 6A-6D and 6E-6H can be utilized to denote a beginning and end of a data phase, respectively. At S101, it is determined (e.g., by the monitoring device 200) whether a CAN bus voltage exceeds a threshold 201 for a duration exceeding time interval 251. If NO, the monitoring device continues checking until the CAN bus voltage exceeds the threshold 201 (e.g., YES at S101). At S102, it is determined (e.g., by the monitoring device 200) whether the CAN bus voltage (e.g., immediately following the voltage exceeding threshold 201) is now less than voltage threshold 203. If NO, the process returns to S101. If YES, the process proceeds to S103. At S103, the start of a CAN XL data phase is confirmed as detected. In this regard, a transceiver mode switch request can become active. A mode switch request can be routed from a first CAN transceiver for a switch from a first transceiver mode to a second CAN transceiver mode to at least one other CAN transceiver. At S104, it is determined (e.g., by the monitoring device 200) whether CAN bus voltage between the threshold 204 and threshold 205 is succeeded by a voltage above the threshold 204 for a duration exceeding interval 262. If NO, the bus voltage indicates that the data phase is still occurring. If YES, then the end of a CAN XL data phase is detected. In this regard, a transceiver mode switch request become non-active. A mode switch request can be routed from the first CAN transceiver for a switch from a second transceiver mode to a first transceiver mode to at least one other CAN transceiver.

Figure 8:
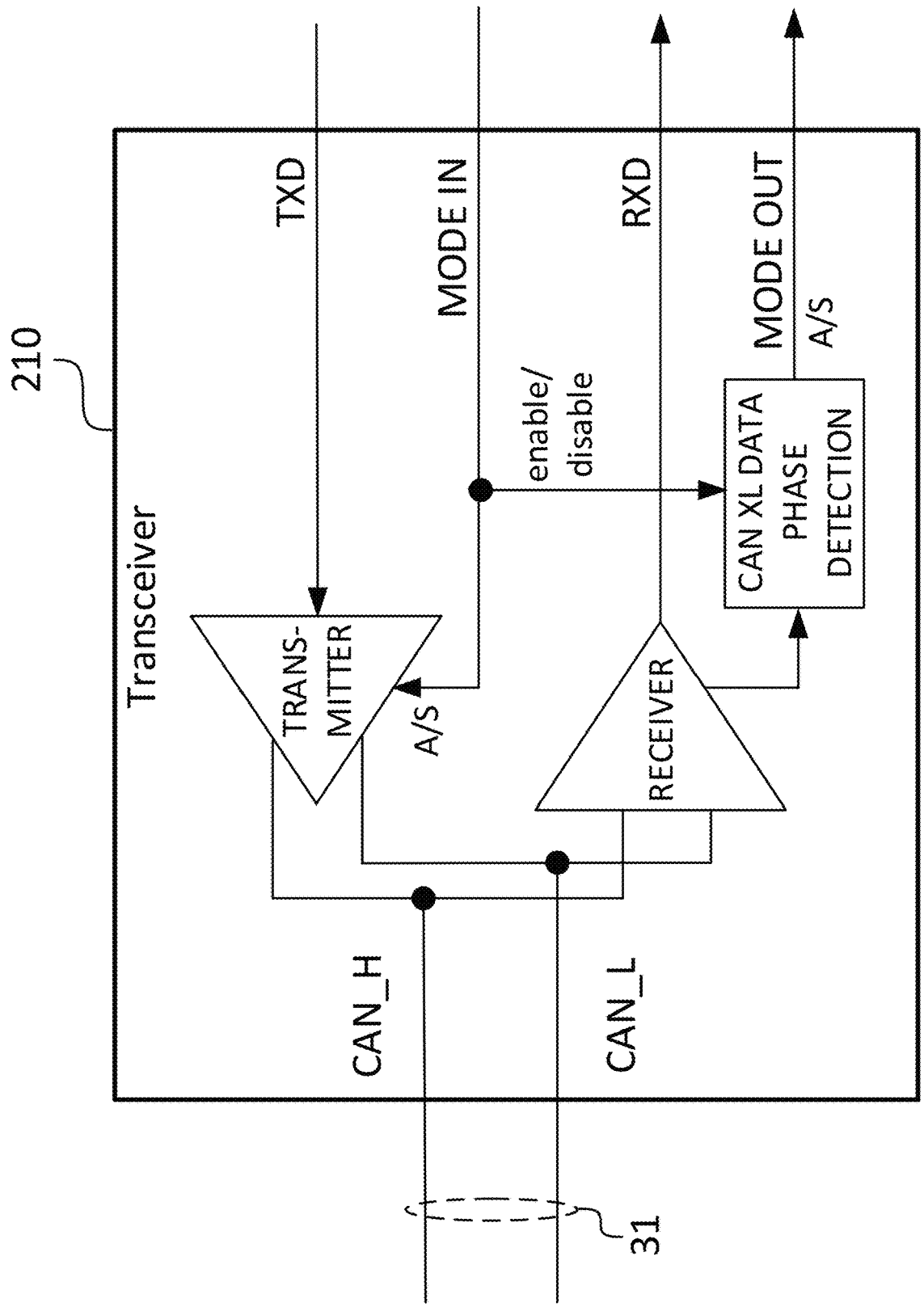
FIG. 8 is a block diagram of a transceiver in accordance with one or more embodiments described herein.

FIG. 8 illustrates a block diagram of a transceiver 210 (e.g., which can be similar to transceivers 220 and 230). The TXD can comprise a transmission of a data bitstream from a signal router (not depicted). MODE IN 214 can comprise an asymmetric or symmetric mode request (e.g., from mode router 240). The RXD can comprise reception of a bitstream (e.g., to a signal router). MODE OUT can comprise an asymmetric or symmetric mode request (e.g., to mode router 240). A signal router can be configured to route the CAN signals transmitted over any CAN bus to the remaining CAN buses. For instance, any CAN signal, (e.g., dominant data, logic 0/1 data) transmitted by first CAN XL node 11 is received by the first CAN transceiver 210 and then routed via the signal router to the second CAN transceiver 220 and the second CAN XL node 12 as well as to the third CAN transceiver 230 and the third CAN node 13.

Figure 9:
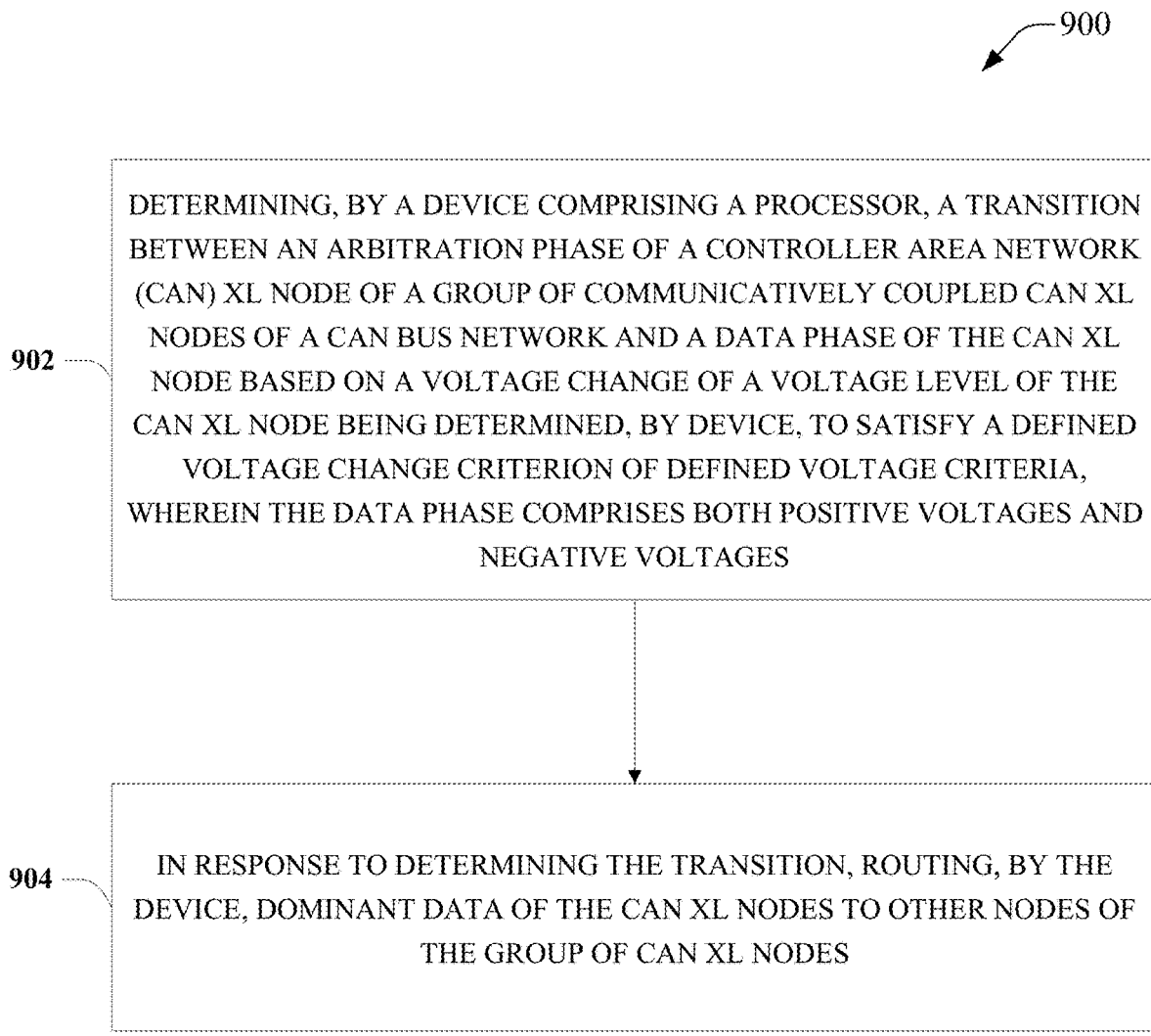
FIG. 9 is a block flow diagram for a process for determining CAN XL transitions in accordance with one or more embodiments described herein.

FIG. 9 illustrates a block flow diagram for a process 900 for determining CAN XL transitions in accordance with one or more embodiments described herein. At 902, the process 900 can comprise determining, by a device comprising a processor, a transition between an arbitration phase of a Controller Area Network (CAN) XL node of a group of communicatively coupled CAN XL nodes of a CAN bus network and a data phase of the CAN XL node based on a voltage change of a voltage level of the CAN XL node being determined, by device, to satisfy a defined voltage change criterion of defined voltage criteria, wherein the data phase comprises both positive voltages and negative voltages. At 904, the process 900 can comprise in response to determining the transition, routing, by the device, dominant data or logic 0/1 data of the CAN XL nodes to other nodes of the group of CAN XL nodes.

Figure 10:
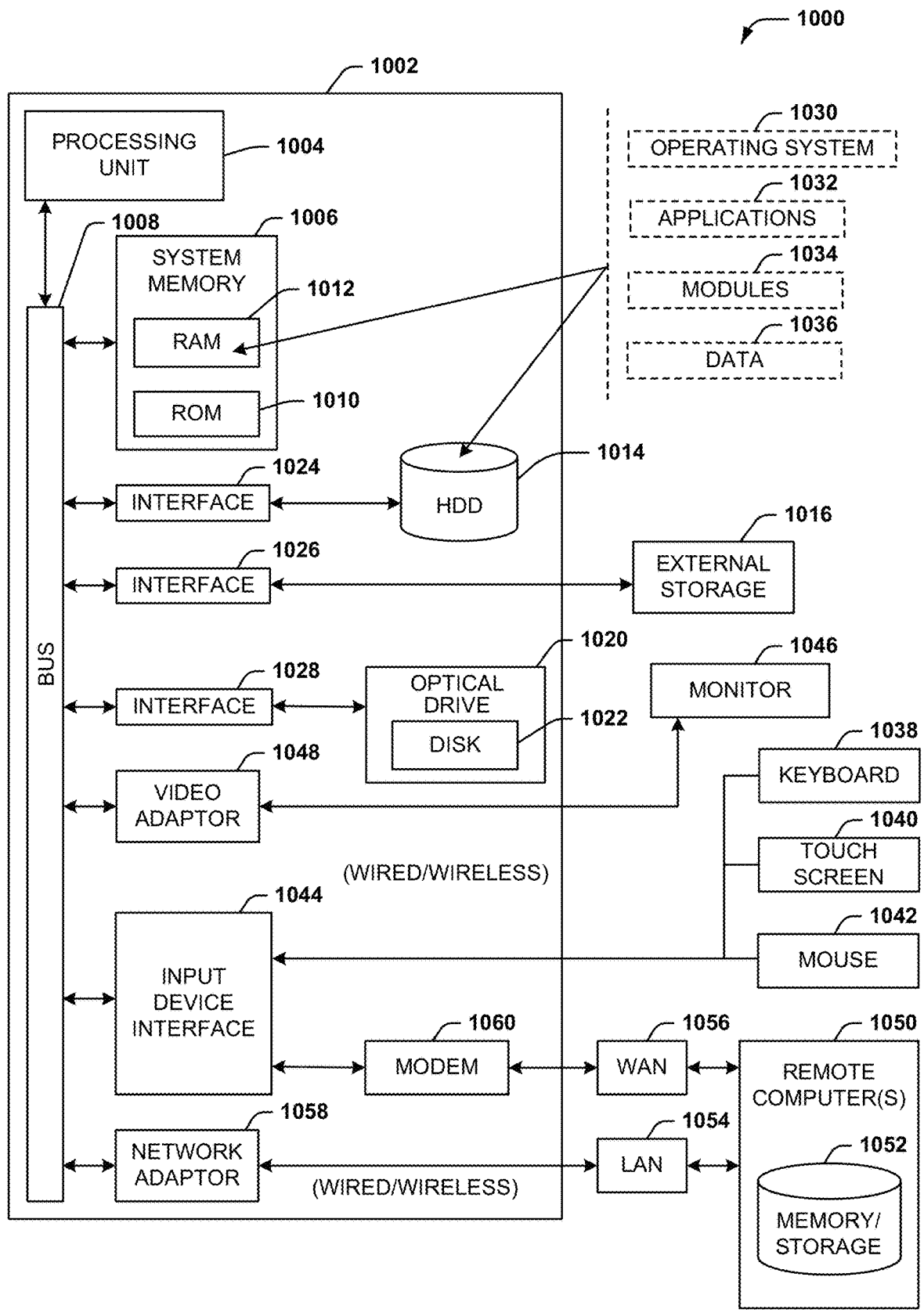
FIG. 10 is an example, non-limiting computing environment in which one or more embodiments described herein can be implemented.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 11:
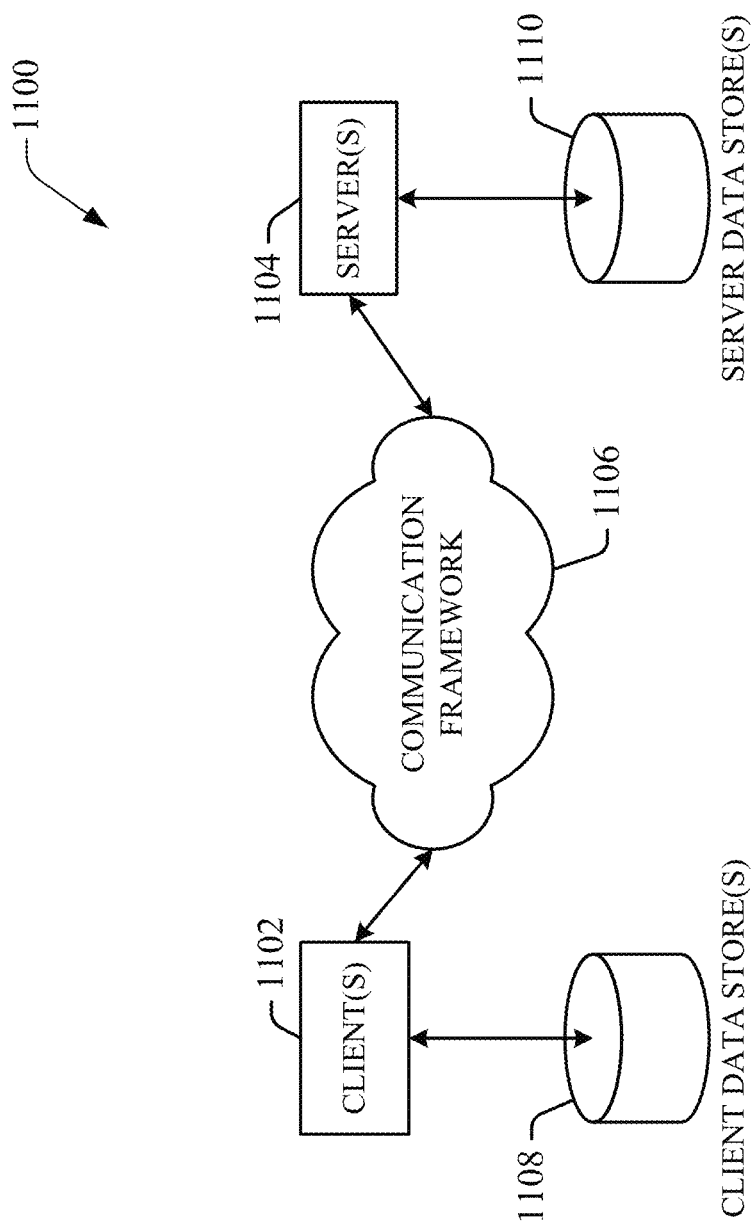
FIG. 11 is an example, non-limiting networking environment in which one or more embodiments described herein can be implemented.

Referring now to FIG. 11, there is illustrated a schematic block diagram of a computing environment 1100 in accordance with this specification. The system 1100 includes one or more client(s) 1102, (e.g., computers, smart phones, tablets, cameras, PDA's). The client(s) 1102 can be hardware and/or software (e.g., threads, processes, computing devices). The client(s) 1102 can house cookie(s) and/or associated contextual information by employing the specification, for example.

The system 1100 also includes one or more server(s) 1104. The server(s) 1104 can also be hardware or hardware in combination with software (e.g., threads, processes, computing devices). The servers 1104 can house threads to perform transformations of media items by employing aspects of this disclosure, for example. One possible communication between a client 1102 and a server 1104 can be in the form of a data packet adapted to be transmitted between two or more computer processes wherein data packets may include coded analyzed headspaces and/or input. The data packet can include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

In one exemplary implementation, a client 1102 can transfer an encoded file, (e.g., encoded media item), to server 1104. Server 1104 can store the file, decode the file, or transmit the file to another client 1102. It is noted that a client 1102 can also transfer uncompressed file to a server 1104 and server 1104 can compress the file and/or transform the file in accordance with this disclosure. Likewise, server 1104 can encode information and transmit the information via communication framework 1106 to one or more clients 1102.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further aspects of the invention are provided by the subject matter of the following clauses:

1. A method, comprising: determining, by a device comprising a processor, a transition between an arbitration phase of a Controller Area Network (CAN) XL node of a group of communicatively coupled CAN XL nodes of a CAN bus network and a data phase of the CAN XL node based on a voltage change of a voltage level of the CAN XL node being determined, by device, to satisfy a defined voltage change criterion of defined voltage criteria, wherein the data phase comprises both positive voltages and negative voltages; and in response to determining the transition, routing, by the device, dominant data or logic 0/1 data of the CAN XL nodes to other nodes of the group of CAN XL nodes.

2. The method of any preceding clause, wherein the arbitration phase comprises an asymmetric differential bus mode and wherein the data phase comprises a symmetric differential bus mode.

3. The method of any preceding clause, wherein the transition occurs within a defined amount of time.

4. The method of any preceding clause, wherein the transition comprises a transition from the arbitration phase to the data phase, and wherein positive voltage of the data phase is smaller than positive voltage of the arbitration phase.

5. The method of any preceding clause, wherein the transition comprises a first voltage of the voltage level comprising positive voltage larger than a first voltage threshold succeeded by a second voltage of the voltage level comprising negative voltage larger than a second voltage threshold.

6. The method of any preceding clause, wherein the transition comprises a first voltage of the voltage level comprising positive voltage larger than a first voltage threshold succeeded by a second voltage of the voltage level comprising a positive voltage between a second voltage threshold and a third voltage threshold.

7. The method of any preceding clause, wherein the transition comprises a first voltage of the voltage level comprising zero volts succeeded by a second voltage of the voltage level comprising a negative voltage larger than a negative voltage threshold.

8. The method any preceding clause, wherein the transition comprises a first voltage of the voltage level comprising zero volts succeeded by a second voltage of the voltage level comprising a positive voltage between a first positive voltage threshold and a second positive voltage threshold.

9. The method of any preceding clause, wherein the transition comprises a transition from the data phase to the arbitration phase, and wherein positive voltage of the data phase is smaller than positive voltage of the arbitration phase.

10. The method of any preceding clause, wherein the transition comprises a first voltage of the voltage level comprising a negative voltage larger than a first negative voltage threshold succeeded by a second voltage larger than a first positive voltage threshold.

11. The method of any preceding clause, wherein the transition comprises a first voltage of the voltage level comprising a positive voltage between a first positive voltage threshold and a second positive voltage threshold succeeded by a second voltage above the first positive voltage threshold.

12. The method of any preceding clause, wherein the transition comprises a first voltage of the voltage level comprising a negative voltage larger than a first negative voltage threshold succeeded by a second voltage comprising zero volts.

13. The method of any preceding clause, wherein the transition comprises a first voltage of the voltage level between a first positive voltage threshold and a second positive voltage threshold succeeded by a second voltage comprising zero volts.

14. The method of clause 1 above with any set of combinations of clauses 2-13 above.

15. A monitoring device, comprising:
a transceiver that determines a transition between an arbitration phase of a Controller Area Network (CAN) XL node of a group of communicatively coupled CAN XL nodes of a CAN bus network and a data phase of the CAN XL node based on a voltage change of a voltage level of the CAN XL node being determined to satisfy a defined voltage change criterion of defined voltage criteria, wherein the data phase comprises both positive voltages and negative voltages; and
a mode router that, in response to determining the transition, routes dominant data or logic 0/1 data of the CAN XL nodes to other nodes of the group of CAN XL nodes.

16. The monitoring device of any preceding clause, the arbitration phase only utilizes zero or positive differential bus voltage, the data phase only utilizes positive or negative voltage differential bus, and the data phase does not utilize zero differential bus voltage.

17. The monitoring device of any preceding clause, wherein the mode router, in response to the transceiver determining the transition, further routes a mode switch request from the transceiver for a switch from a first transceiver bus mode to a second transceiver bus mode to one or more transceivers of the other nodes.

18. The monitoring device of any preceding clause, wherein the first transceiver bus mode comprises an asymmetric differential arbitration phase mode and wherein the second transceiver bus mode comprises a symmetric differential data phase mode.

19. The monitoring device of any preceding clause, wherein the first transceiver bus mode comprises a symmetric differential data phase mode and wherein the second transceiver bus mode comprises an asymmetric differential arbitration phase mode.

20. The monitoring device of clause 15 above with any set of combinations of clauses 16-19 above.

21. A non-transitory machine-readable medium, comprising executable instructions that, when executed by a processor, facilitate performance of operations, comprising:
determining a transition between an arbitration phase of a Controller Area Network (CAN) XL node of a group of communicatively coupled CAN XL nodes of a CAN bus network and a data phase of the CAN XL node based on a voltage change of a bus voltage level of the CAN XL node being determined to satisfy a defined voltage change criterion of defined voltage criteria, wherein the data phase comprises both positive voltages and negative voltages; and
in response to determining the transition, routing dominant data or logic 0/1 data of the CAN XL nodes to other nodes of the group of CAN XL nodes.

22. The non-transitory machine-readable medium of any preceding clause, wherein:
the arbitration phase only utilizes zero or positive differential bus voltage,
the data phase only utilizes positive or negative differential bus voltage, and
the data phase does not utilize zero differential voltage.

What is claimed is:
1. A method, comprising:
monitoring, by a device comprising a processor, a Controller Area Network (CAN) bus, for a group of transition types, wherein the group of transition types comprises a first sub-group of at least four arbitration phase to data phase transition types, and a second sub-group of at least four data phase to arbitration phase transition types;

based on the monitoring, determining, by the device, a transition, having a type from the group of transition types, between an arbitration phase of a CAN XL node of a group of communicatively coupled CAN XL nodes of the CAN bus and a data phase of the CAN XL node, where the transition is determined based on a voltage change of a voltage level of the CAN XL node being determined to satisfy a defined voltage change criterion of defined voltage criteria, wherein the data phase comprises both positive voltages and negative voltages; and in response to determining the type of the transition, routing, by the device, dominant data or logic 0/1 data of the CAN XL nodes to other nodes of the group of CAN XL nodes.

2. The method of claim 1, wherein the arbitration phase comprises an asymmetric differential bus mode and wherein the data phase comprises a symmetric differential bus mode.

3. The method of claim 1, wherein the transition occurs within a defined amount of time.

4. The method of claim 1, wherein positive voltage of the data phase is smaller than positive voltage of the arbitration phase.

5. The method of claim 1, wherein an arbitration phase to data phase transition type of the first sub-group of at least four arbitration phase to data phase transition types comprises a first voltage of the voltage level comprising positive voltage larger than a first voltage threshold succeeded by a second voltage of the voltage level comprising negative voltage larger than a second voltage threshold.

6. The method of claim 1, wherein an arbitration phase to data phase transition type of the first sub-group of at least four arbitration phase to data phase transition types comprises a first voltage of the voltage level comprising positive voltage larger than a first voltage threshold succeeded by a second voltage of the voltage level comprising a positive voltage between a second voltage threshold and a third voltage threshold.

7. The method of claim 1, wherein an arbitration phase to data phase transition type of the first sub-group of at least four arbitration phase to data phase transition types comprises a first voltage of the voltage level comprising zero volts succeeded by a second voltage of the voltage level comprising a negative voltage larger than a negative voltage threshold.

8. The method of claim 1, wherein an arbitration phase to data phase transition type of the first sub-group of at least four arbitration phase to data phase transition types comprises a first voltage of the voltage level comprising zero volts succeeded by a second voltage of the voltage level comprising a positive voltage between a first positive voltage threshold and a second positive voltage threshold.

9. The method of claim 1, wherein positive voltage of the data phase is smaller than positive voltage of the arbitration phase.

10. The method of claim 1, wherein a data phase to arbitration phase transition type of the second sub-group of at least four data phase to arbitration phase transition types comprises a first voltage of the voltage level comprising a negative voltage larger than a first negative voltage threshold succeeded by a second voltage larger than a first positive voltage threshold.

11. The method of claim 1, wherein a data phase to arbitration phase transition type of the second sub-group of at least four data phase to arbitration phase transition types comprises a first voltage of the voltage level comprising a positive voltage between a first positive voltage threshold and a second positive voltage threshold succeeded by a second voltage above the first positive voltage threshold.

12. The method of claim 1, wherein a data phase to arbitration phase transition type of the second sub-group of at least four data phase to arbitration phase transition types comprises a first voltage of the voltage level comprising a negative voltage larger than a first negative voltage threshold succeeded by a second voltage comprising zero volts.

13. The method of claim 1, wherein a data phase to arbitration phase transition type of the second sub-group of at least four data phase to arbitration phase transition types comprises a first voltage of the voltage level between a first positive voltage threshold and a second positive voltage threshold succeeded by a second voltage comprising zero volts.

14. A monitoring device, comprising:
a transceiver that:
monitors a Controller Area Network (CAN) bus for a group of transition types, wherein the group of transition types comprises a first sub-group of at least four arbitration phase to data phase transition types, and a second sub-group of at least four data phase to arbitration phase transition types, and determines a transition, having a type from the group of transition types, between an arbitration phase of a CAN XL node of a group of communicatively coupled CAN XL nodes of the CAN bus and a data phase of the CAN XL node, where the transition is determined based on a voltage change of a voltage level of the CAN XL node being determined to satisfy a defined voltage change criterion of defined voltage criteria, wherein the data phase comprises both positive voltages and negative voltages; and a mode router that, in response to determining the transition, routes dominant data or logic 0/1 data of the CAN XL nodes to other nodes of the group of CAN XL nodes.

15. The monitoring device of claim 14, wherein:
the arbitration phase only utilizes zero or positive differential bus voltage,
the data phase only utilizes positive or negative voltage differential bus, and
the data phase does not utilize zero differential bus voltage.

16. The monitoring device of claim 14, wherein the mode router, in response to the transceiver determining the transition, further routes a mode switch request from the transceiver for a switch from a first transceiver bus mode to a second transceiver bus mode to one or more transceivers of the other nodes.

17. The monitoring device of claim 16, wherein the first transceiver bus mode comprises an asymmetric differential arbitration phase mode and wherein the second transceiver bus mode comprises a symmetric differential data phase mode.

18. The monitoring device of claim 16, wherein the first transceiver bus mode comprises a symmetric differential data phase mode and wherein the second transceiver bus mode comprises an asymmetric differential arbitration phase mode.

19. A non-transitory machine-readable medium, comprising executable instructions that, when executed by a processor, facilitate performance of operations, comprising:

monitoring a Controller Area Network (CAN) bus, for a group of transition types, wherein the group of transition types comprises a first sub-group of at least four arbitration phase to data phase transition types, and a second sub-group of at least four data phase to arbitration phase transition types;

determining a transition, having a type from the group of transition types, between an arbitration phase of a CAN XL node of a group of communicatively coupled CAN XL nodes of the CAN bus and a data phase of the CAN XL node, where the transition is determined based on a voltage change of a bus voltage level of the CAN XL node being determined to satisfy a defined voltage change criterion of defined voltage criteria, wherein the data phase comprises both positive voltages and negative voltages; and in response to determining the transition, routing dominant data or logic 0/1 data of the CAN XL nodes to other nodes of the group of CAN XL nodes.

20. The non-transitory machine-readable medium of claim 19, wherein:

the arbitration phase only utilizes zero or positive differential bus voltage, the data phase only utilizes positive or negative voltage differential bus, and the data phase does not utilize zero differential bus voltage.

* * * * *